(12) United States Patent
Schneider

(10) Patent No.: US 11,647,705 B2
(45) Date of Patent: May 16, 2023

(54) IN-GROUND AGRICULTURAL LIQUID CAPTURE TRAY AND AGRICULTURAL LIQUID CONSERVATION SYSTEM

(71) Applicant: Steven A. Schneider, San Rafael, CA (US)

(72) Inventor: Steven A. Schneider, San Rafael, CA (US)

( * ) Notice: Subject to any disclaimer, the term of this patent is extended or adjusted under 35 U.S.C. 154(b) by 782 days.

(21) Appl. No.: 16/175,481

(22) Filed: Oct. 30, 2018

(65) Prior Publication Data
US 2021/0212275 A1    Jul. 15, 2021

(51) Int. Cl.
*A01G 25/06* (2006.01)
*A01G 25/16* (2006.01)

(52) U.S. Cl.
CPC ........... *A01G 25/06* (2013.01); *A01G 25/167* (2013.01)

(58) Field of Classification Search
None
See application file for complete search history.

(56) References Cited

U.S. PATENT DOCUMENTS

| | | | |
|---|---|---|---|
| 1,975,129 A | 10/1934 | Sherman | |
| 3,676,953 A | 7/1972 | DeLonge | |
| 4,188,153 A | 2/1980 | Taylor | |
| 4,495,725 A | 1/1985 | Talbott | |
| 4,671,699 A * | 6/1987 | Roach | E01C 5/20 404/41 |
| 4,943,185 A * | 7/1990 | McGuckin | E02B 11/00 210/170.07 |
| 4,984,384 A | 1/1991 | Kaufmann | |
| 5,011,327 A | 4/1991 | Thiac | |
| 5,256,007 A | 10/1993 | Allen | |

(Continued)

FOREIGN PATENT DOCUMENTS

| | | | |
|---|---|---|---|
| DE | 19611660 A1 * | 10/1997 | E04D 11/005 |
| EP | 1044599 A1 * | 10/2000 | A01G 31/02 |

(Continued)

OTHER PUBLICATIONS

PCT Branch; International Search Report for Application No. PCT/US2019/058670, dated Feb. 11, 2020.
(Continued)

*Primary Examiner* — David J Parsley
*Assistant Examiner* — Morgan T Barlow

(57) ABSTRACT

A liquid capture tray and conservation system for capturing agricultural liquids which would otherwise be wasted and could contaminate groundwater. The liquid capture tray has a tray body and a reservoir matrix across the tray body. The reservoir matrix has a plurality of adjacent interconnected concave liquid capture cups, each with a sidewall and bottom wall defining an upwardly disposed reservoir. The tray is positioned below the root zone of a plant growing area to capture liquids that pass through the root zone into the reservoirs of the cups. Apertures in the tray body allow excess liquids to drain from the tray. A connecting mechanism can be utilized to connect two trays together. Cut-outs in the sidewalls of the cups allow liquid to move from one cup to another to disperse liquid across the reservoir matrix. The system includes a growing area, root zone, liquid and liquid capture tray.

3 Claims, 10 Drawing Sheets

(56) References Cited

U.S. PATENT DOCUMENTS

| | | | |
|---|---|---|---|
| 5,310,584 A | 5/1994 | Jacoby et al. | |
| 5,370,475 A | 12/1994 | LeBlanc | |
| 5,383,744 A | 1/1995 | Hendershot | |
| 5,460,867 A | 10/1995 | Magnuson et al. | |
| 5,746,545 A | 5/1998 | Parker, Jr. | |
| 5,846,021 A | 12/1998 | Bailey et al. | |
| 5,916,104 A | 6/1999 | Lucenet | |
| 6,178,690 B1 * | 1/2001 | Yoshida | A01G 9/02 47/65.9 |
| 6,263,616 B1 * | 7/2001 | Hummer | A01G 9/033 47/65.9 |
| 6,672,016 B2 * | 1/2004 | Janesky | E02D 31/06 405/38 |
| 6,701,666 B1 * | 3/2004 | Paulino | A01B 79/00 47/1.01 R |
| 7,258,326 B2 | 8/2007 | Talbott | |
| 7,387,295 B2 | 7/2008 | Talbott | |
| 7,810,291 B2 * | 10/2010 | McPherson | E02D 31/02 52/302.3 |
| 8,133,123 B2 * | 3/2012 | De Vries | E01C 13/02 472/92 |
| 8,696,241 B2 * | 4/2014 | Lee | E01C 3/06 405/39 |
| 9,103,076 B2 * | 8/2015 | Hassan | E01C 13/00 |
| 2005/0193935 A1 | 9/2005 | Schneider | |
| 2007/0079547 A1 * | 4/2007 | Gold | A01G 9/033 47/18 |
| 2009/0320364 A1 * | 12/2009 | MacKenzie | A01G 9/02 47/65.9 |
| 2010/0300019 A1 | 12/2010 | Lowe et al. | |
| 2016/0165815 A1 | 6/2016 | Agg et al. | |
| 2017/0020090 A1 * | 1/2017 | GRADEk | A01G 25/00 |

FOREIGN PATENT DOCUMENTS

| | | | | |
|---|---|---|---|---|
| GB | 2048635 A | | 5/1979 | |
| GB | 2461314 A | * | 12/2009 | A01G 9/033 |
| WO | WO-2015077862 A1 | * | 6/2015 | A01G 24/30 |
| WO | WO-2016037275 A1 | * | 3/2016 | A01G 9/033 |
| WO | WO-2016125197 A1 | * | 8/2016 | E04D 11/002 |

OTHER PUBLICATIONS

PCT Branch; Written Opinion of the International Searching Authority for Application No. PCT/US2019/058670, dated Feb. 11, 2020.

* cited by examiner

IN-GROUND AGRICULTURAL LIQUID CAPTURE TRAY AND AGRICULTURAL LIQUID CONSERVATION SYSTEM

CROSS-REFERENCE TO RELATED APPLICATIONS

None.

STATEMENT REGARDING FEDERALLY SPONSORED RESEARCH

Not Applicable.

REFERENCE TO A SEQUENCE LISTING, A TABLE OR A COMPUTER PROGRAM LISTING APPENDIX SUBMITTED ON A COMPACT DISC

Not Applicable.

BACKGROUND OF THE INVENTION

A. Field of the Invention

The present invention relates generally to apparatuses and systems that are beneficially utilized to improve the utilization of water and other agricultural liquids that are used to grow plants in soil. More particularly, the present invention relates to such apparatuses and systems that are configured to more efficiently and effectively utilize agricultural liquids which are applied to soil to grow plants, reduce the consumption of such liquids and reduce potential pollution from the use of such liquids. Even more particularly, the present invention relates to such apparatuses and systems that are positioned in the soil below a plant root zone of one or more plants to capture agricultural liquids which are applied to the soil that would otherwise be wasted or flow into a water zone below the plant root zone.

B. Background

Irrigation systems have generally been in use for thousands of years to deliver water to trees, vines and other plants/crops, including vegetable plants, fruit plants and forage crops (collectively, all such trees, vines and plants are herein referred to collectively as "plants"). As well known to persons who are skilled in the relevant art, older plant irrigation systems comprise a plurality of canals, trenches, furrows and/or other generally open delivery conduits that are utilized to deliver water to a field having a plurality of plants. In one configuration, water is delivered to the plants using flood irrigation techniques where the water is spread over the surface area of the field. In other configurations, open conduits deliver the water directly to the plants. A relatively recent improvement for irrigation systems, but which nevertheless has been in use for many years, are irrigation systems that use a plurality of closed conduits, such as pipes or the like, to deliver water to or near the specific location of each plant. In general, closed conduit irrigation systems reduce the loss of irrigation water that would otherwise occur through the ground and evaporation, both of which are inherent when using flood irrigation and open delivery conduits, by more specifically directing the water to each plant.

Closed conduit irrigation systems generally have a water distribution apparatus, which is typically a manifold or the like, that connects to a plurality of distribution lines to distribute water from a source of water, which may be a well or other source, to the plants through the water pipes. As well known in the art, the water distribution apparatus is utilized to prevent non-selective flow disparity between the distribution lines, which would otherwise result from pressure disparity between the various pipes and water flow lines to ensure the delivery of water to the plants that are reflective of that which is the most beneficial for the plants. In one configuration of a closed conduit irrigation system, the pipes that deliver water directly to the plant have an open end at the plant to flow water to or around the plant. Most often, however, closed conduit irrigation systems utilize a flow control device, such as a sprinkler head, valve or the like, that directs water to where the water will most benefit the plant.

One type of closed conduit irrigation system is commonly referred to as a drip irrigation system. In one embodiment of such systems, the flow control device is a single drip emitter placed at the end of the water pipe that is selected so as to provide the desired amount of water to the plant. Typically, however, drip irrigation systems utilize a plurality of drip emitters that are arranged along the distribution line at the general position of each plant to be irrigated thereby. Water flows from the manifold or other water distribution apparatus through the distribution line towards the plants to be watered by that line, exiting the line at the end of the distribution line or through the emitters placed along the line. As well known to persons who are skilled in the art, drip irrigation systems generally better control the use and placement of water to a plant than non-drip irrigation systems by precisely placing the water at the plant. In addition, most drip irrigation systems are specifically configured to allow for irrigation using very low flow rates, which more efficiently uses water and generally allows for reduced consumption of water than would otherwise be required, making drip irrigation systems particularly popular in the more arid regions of the world.

One issue that is particularly important and relevant to all irrigation systems is the quantity of water that is necessary to provide what the plant needs to grow and produce its crop without wasting water. With regard to how much water is beneficial to apply to the plants during each irrigation cycle, persons who are skilled in the relevant art know that it can be harmful to a plant to provide too little or too much water, both of which can result in a reduction of the amount of crop that will be produced by the plant. In addition to potentially harming the plant and reducing crop production, overwatering also results in a waste of water and a waste of the energy that was required to provide the water to the irrigation system and deliver the water to the plant. In addition to unnecessary cost, over-utilization of water and energy are not helpful to the environment.

As well known in the agricultural industry, one of the most common concerns with applying fertilizers and other soil amendments to a field is to ensure the soil amendments will move into and sufficiently through the soil to a point where the soil amendments will be beneficial for the plants that are growing or will be grown in the field. Generally, most soil amendments are applied to the soil with the objective that the soil amendments will be taken up by the plant through its roots and, as such, will move into but not past the plant root zone, which is the vertical area below the surface of the soil to the lowest point likely to be reached by the plant's roots. Soil amendments that remain on or very near the surface of the soil, more often a problem with solid soil amendments, are not likely to be of much, if any, benefit to the plant. In order for solid soil amendments to infiltrate into the soil, the soil amendment is mixed with water or water is applied to the field, such as by rain, flood irrigation or other forms of irrigation, after the solid soil amendment is applied to the soil. Liquid soil amendments, by their nature, are generally able to be delivered into most soils without significant problems of infiltrating into the soil, often by including the liquid soil amendment with the irrigation water so as to be delivered therewith or placing water over the liquid soil amendment after it has been applied to the field to move it through the soil. For purposes of describing the present invention, the term "agricultural liquid" includes water and soil amendments that are liquid or are solid materials which have been mixed with, combined with or that otherwise move with a liquid through the soil and into, or past, the root zone of plants that are growing in the soil. For instance, agricultural liquid includes dry fertilizers or other soil amendments that are placed on the surface of the soil but which move through the soil as a result of dissolving in or being otherwise moved down through the soil by irrigation water, however the water may be applied.

Unfortunately, for many growing areas the soil is such that agricultural liquids may move too well through the soil and, as a result, pass through and end up below the root zone of the plants growing in the growing area. Naturally, such "over-infiltration" wastes a portion of the water that was applied to the plants and results in significantly less effective application of the soil amendments to the soil and plants, both of which leads to substantially less effective utilization of the water and the soil amendments for the crops growing or to be grown in a field or other growing area. The water passing through the root zone can result in an insufficient amount of water uptake by the plants growing in the soil. In addition to wasting the portion of the water, liquid fertilizers and other soil amendments that move beyond the root zone, the soil amendments may infiltrate into the water table or other water zone located below the soil and contaminate the water therein. This can become an even broader environmental issue if the chemicals move into a nearby surface water location, including oceans, lakes, rivers, canals and the like.

Recognizing the problems with water and soil amendments passing through the root zone of plants growing or to be grown in a field or other growing area, apparatuses and systems have been developed to reduce the loss of water and soil amendments. For instance, U.S. Pat. No. 5,383,744 to Hendershot describes a subirrigation system and method in which water reservoirs, formed by cutting a tire in half, are buried concave side up below growing plants to trap and retain moisture that is used to nurture the plant roots. The tires are cut in half along a medial plane normal to the central rotational axis of the tire to form two reservoir traps that each have an annular semi-cylindrical or concave moisture retaining interior chamber. One or more of these annular reservoirs are buried in the ground below the normal or expected root zone of the plants, with the open concave side facing upwardly such that water applied to the surface of the planting area will percolate downwardly through the soil to be captured and trapped within the chamber. Because the reservoir trap has a large opening at its center, the patent describes use of a reservoir cap that comprises a central concave-convex pan portion and annular planar rim extending radially outwardly at its upper edge which is placed over the open center of the annular reservoir trap to close the center opening. The reservoir traps can be laid out in a single layer, with or without use of the reservoir caps, or placed in double layers to capture more water.

U.S. Patent Publication No. 2005/0193935 to Schneider (who is the present inventor) describes a farming system that compensates for soils which drain too well by underlaying the crop fields with a planar network of liquid reserve matrices. The reserve matrices are placed just below the root zone and below the level that ordinary seasonal tilling will reach. In one embodiment, the top soil is laid open and the underlayment is patterned out like carpet tiles. The top soil is then back filled to bury the liquid reserve matrices at a predetermined depth. In another embodiment, individual cone shaped cups are forcibly driven deep into the ground below the seasonal tilling depth. In either embodiment, the apparatus and system is configured to capture water and other liquids which pass through the root zone to reduce the amount of liquids that would otherwise be lost below the root zone.

The prior art apparatuses and systems have various limitations that have generally limited their acceptance in the industry. One such limitation is that the prior art apparatuses and system do not handle the circumstance where an excess amount of agricultural liquids drain below the root zone, which can result in a build-up of agricultural liquids above the apparatus that can flood or inundate the root zone and the roots with agricultural liquid. As well known to persons who are skilled in the art, such inundation can damage the roots and result in harm to the plants and/or a reduction in the amount of crop produced by the plants. Another limitation of some prior art apparatuses and systems is that the liquid capture apparatus does not provide very sufficient coverage of the area below the root zone, which allows a significant portion of the agricultural liquid to be wasted below the root zone and possibly flow into an underground water zone. Yet another limitation of some prior art apparatuses and systems is that they do not allow the user to be able to easily and quickly expand the area to be covered by connecting a plurality of liquid capture apparatuses together.

What is needed, therefore, is an improved apparatus and system for reducing the amount of agricultural liquids, including irrigation water and liquid soil amendments, that are lost or otherwise wasted in agricultural operations that grow plants in soil. More specifically, what is needed is a new apparatus and system that is structured and arranged to reduce the amount of agricultural liquids which are wasted because they passed through the root zone below a plant and, as a result, do not benefit the health and/or growth of the plant. The new apparatus and system should be structured and arranged to be placed in the soil below the root zone of a plant to capture water and other agricultural liquids that were applied to the plant but which passed through the root zone in order to reduce the amount of agricultural liquids that are lost to the growing area and which may contaminate the water table or a water zone below the root zone. Preferably, the new apparatus and system should be configured to cover, if desired, large sized growing areas by allowing the user to place multiple apparatuses in joining relationship. The new apparatus and system should be easily adaptable for use in a wide variety of different types of agricultural growing areas, including large fields, small gardens and containers. Preferably, the new apparatus and system should be easy to use and relatively inexpensive to manufacture so that is can be widely utilized.

SUMMARY OF THE INVENTION

The apparatus and system of the present invention provides the benefits and solves the problems that are identified above. That is to say, the new in-ground agricultural liquid capture apparatus and system of the present invention is structured and arranged to reduce the amount of agricultural liquids that would be lost or otherwise wasted in agricultural operations that grow plants in soil as a result of the agricultural liquids moving downward beyond the root zone of the plants. More specifically, the new apparatus is configured as a tray that is placed in the soil below the anticipated root zone of plants which will be growing in the soil so as to capture agricultural liquids which migrate downward below the root zone and, as a result, would not otherwise benefit the health and/or growth of the plant. The new agricultural liquid capture tray comprises a plurality of adjacent cup-like structures that each define an upwardly disposed reservoir which captures water and other agricultural liquids that were applied to plants growing in the soil above the tray but which liquids passed through the plant root zone. As such, the new tray and a growing system using such tray will significantly reduce the amount of agricultural liquids that are lost to the growing area. By capturing otherwise lost agricultural liquids, the new tray and system will help optimize water and chemical usage and reduce the likelihood that such liquids will contaminate a water table or water zone below the plant root zone. The new tray and growing system will also allow the plants to draw-up and utilize the agricultural liquids, through capillary action into the plant's root zone, that are captured in the tray when the liquids are needed by the plant, thereby achieving a more optimal usage of the agricultural liquids. As such, the present invention provides a new liquid capture and liquid dispersion system for plants.

In a preferred configuration, the agricultural liquid capture tray of the present invention is structured and arranged with a tray body having a plurality of upwardly disposed reservoirs that allow liquid to flow from one reservoir to another, has a plurality of drainage holes which allow excess liquids to drain from the tray to avoid harming the plant roots and allows piping and sensors to be utilized therewith in a manner which will benefit the plants growing in the soil located above the new agricultural liquid capture tray. The agricultural liquid conservation system of the present invention utilizes the above-described tray in the soil below the root zone of the plants growing in the soil to capture any agricultural liquids that were applied to the soil, including water from an irrigation or other watering system and agricultural chemicals placed directly on the soil, which migrate past the plant root zone. The new apparatus and system can be utilized with large growing areas by abutting or adjoining multiple trays together to form a liquid capture barrier below the root zone. The liquid capture tray and system of the present invention is easily adaptable for use in a wide variety of different types of growing areas for growing plants, including large fields, small gardens and containers. In the preferred embodiments, the new apparatus and system are easy to use and relatively inexpensive to manufacture.

In one embodiment of the present invention, the new apparatus is configured as a liquid capture tray that generally comprises a tray body and a reservoir matrix. The tray body defines an upper surface, a lower surface and one or more edges and the reservoir matrix is disposed substantially across the tray body between the one or more edges thereof (typically across the width and length of the tray body). The reservoir matrix has a plurality of adjacent interconnected concave-shaped liquid capture cups, with each of the liquid capture cups having one or more sidewalls and a closed bottom wall. Each of the liquid capture cups are open at an upper end of the sidewalls to define an upwardly disposed reservoir in each of the liquid capture cups. The liquid capture tray is positioned below the root zone of the growing area with the upper surface thereof positioned upward toward the root zone. The reservoir matrix is structured and arranged to receive the agricultural liquids in one or more of the reservoirs when the agricultural liquids pass through the root zone so as to capture at least a portion of the agricultural liquids which pass through the root zone to reduce loss of the fluids and reduce the likelihood the fluids will contaminate water zones below the growing area. The reservoir matrix has a ridge between each pair of adjacent liquid capture cups, with the ridge being structured and arranged to provide structural support for the liquid capture tray, particularly when placed under the root zone of the growing area. In one embodiment, the tray body has a first side, a second side, a first end and a second end, with the reservoir matrix extending substantially between the first side and the second side of the tray body and between the first end and the second end of the tray body so as to position liquid capture cups across substantially the entire width and length of the liquid capture tray.

Preferably, the liquid capture tray has one or more, typically a plurality of, overflow apertures disposed through the upper surface of the tray body. Each of the overflow apertures are positioned on the tray body to drain the agricultural liquids from the liquid capture tray when the reservoirs of the liquid capture cups are full of agricultural liquids to prevent inundating the root zone of the growing area and the roots of the plants with the agricultural liquids. In one preferred configuration, the upper surface of the tray body defines a plurality of cup junctions where two or more of the liquid capture cups connect and the liquid capture tray comprises an overflow aperture at each of the cup junctions.

In one embodiment, adjacent trays can be placed in overlapping arrangement by placing the first row of one tray inside the last row of the adjacent tray to connect the trays together. In another embodiment, the tray body defines an edge wall adjacent at least one of the one or more edges thereof. The edge walls can be configured to be placed in overlapping arrangement with an edge wall of an adjacent liquid capture tray. If desired, the liquid capture tray can further comprise a connecting mechanism associated with the edge wall of the liquid capture tray for connecting to an edge wall of an adjacent liquid capture tray. In one configuration, the connecting mechanism comprises connecting apertures in the edge walls and a connecting device, such as a spike, nail or the like, that is positioned through the apertures to connect one liquid capture tray to an adjacent liquid capture tray. In another configuration, the connecting mechanism can be cooperatively configured recesses and protuberances on opposite sides and/or ends of the tray body.

In a preferred embodiment, the liquid capture tray has a wall cut-out in the sidewalls of each of the adjacent liquid capture cups. The wall cut-out is structured and arranged to place the reservoirs of adjacent liquid capture cups in fluid flow communication with each other. This will allow agricultural liquids that are received in the reservoir of one of the liquid capture cups to flow into the reservoirs of adjacent liquid capture cups so as to generally disperse the agricultural liquids across the entire reservoir matrix. In one embodiment, the wall cut-outs are sized and configured to receive at least one or more flow lines and/or a sensor that can monitor the conditions below the root zone of the growing area.

In another embodiment, the present invention is an agricultural liquid conservation system that generally comprises a growing area having soil below a ground surface, one or more plants growing in the soil of the growing area with each of the plants having roots associated therewith, a root zone in the soil below the plants through which the roots extend, an agricultural liquid applied to the growing area to benefit the plants by flowing through the soil and into the root zone and one or more liquid capture trays positioned in the soil below the root zone so as to receive the agricultural liquids which pass downward through the root zone, with each of the one or more liquid capture trays comprising a tray body and a reservoir matrix (as described above).

Accordingly, the primary object of the present invention is to provide a new apparatus and system for capturing agricultural liquids which pass below the root zone of plants that has the advantages set forth above and which overcomes the disadvantages and limitations which are associated with presently available apparatuses and systems for capturing such liquids.

It is an important object of the present invention to provide a new apparatus and system for capturing agricultural liquids that are applied to soil used for growing plants in a growing area but which migrate below the root zone of the plants so as to reduce the loss of such agricultural liquids and the potential for contaminating ground water or other water zones below the root zone.

It is also an important object of the present invention to provide a new apparatus and system for capturing agricultural liquids that is easy to use, readily adaptable to a wide variety of plant growing areas, will not damage the roots of the plants and which is effective for distributing the captured liquids over the surface area of the apparatus.

An important aspect of the present invention is that it provides a new in-ground tray apparatus and a system using such apparatus that accomplishes the objectives set forth above and elsewhere in the present disclosure.

An important aspect of the present invention is that it provides a new in-ground tray apparatus and a system using such apparatus to capture agricultural liquids which pass through the root zone of plants growing in soil to reduce the loss of such agricultural liquids to the growing area and potential contamination of water below the root zone.

Another important aspect of the present invention is that it provides a new apparatus and system for capturing agricultural liquids that is configured as a tray which is placed in the soil below the anticipated root zone of plants that will be growing in the soil in order to capture any agricultural liquids which migrate below the root zone.

Another important aspect of the present invention is that it provides a new apparatus and system for capturing agricultural liquids that comprises a liquid capture tray having a tray body with a plurality of cup-like structures which each define an upwardly disposed liquid reservoir, with the tray being positioned in the soil below the root zone of plants that are growing or which will be growing in the soil to capture the portion of agricultural liquids that are applied to the soil but which pass through the root zone of the plants to prevent loss of the liquids to the growing area and contamination of water located below the root zone.

Another important aspect of the present invention is that it provides a new apparatus and system for capturing agricultural liquids which is structured and arranged to be utilized with a growing area having plants growing in soil to capture the liquids which pass through the root zone of the plants to reduce waste of such liquids.

Another important aspect of the present invention is that it provides a new apparatus and system for capturing agricultural liquids that is structured and arranged to allow captured liquids to move across the tray so as to more effectively capture liquids which pass through a root zone of plants growing in soil above the tray and to allow excess liquids to drain away from the tray to prevent damage to the roots above the tray that could occur as a result of inundating the roots with such liquids.

Another important aspect of the present invention is that it provides a new apparatus and system for capturing agricultural liquids that is structured and arranged to allow the user to easily place irrigation piping across the surface of the tray and to place sensors on the tray to allow the user to monitor and optimize his or her water and chemical usage.

Another important aspect of the present invention is that it provides a new apparatus and system for capturing agricultural liquids that comprises a liquid capture tray which is adaptable for use with a wide range of growing areas, including fields, gardens and containers.

Another important aspect of the present invention is that it provides a new apparatus and system for capturing agricultural liquids that is structured and arranged to be utilized with larger-sized growing areas by abutting or adjoining multiple trays together.

Yet another important aspect of the present invention is that it provides a new apparatus and system for capturing agricultural liquids which, in a preferred configuration, is easy to use and relatively inexpensive to manufacture.

As will be explained in greater detail by reference to the attached figures and the description of the preferred embodiments which follow, the above and other objects and aspects are accomplished or provided by the present invention. As set forth herein and will be readily appreciated by persons who are skilled in the art, the present invention resides in the novel features of form, construction, mode of operation and combination of processes presently described and understood by the claims. The description of the invention which follows is presented for purposes of illustrating one or more of the preferred embodiments of the present invention and is not intended to be exhaustive or limiting of the invention. The scope of the invention is only limited by the claims which follow after the discussion.

BRIEF DESCRIPTION OF THE DRAWINGS

In the drawings which illustrate the preferred embodiments and the best modes presently contemplated for carrying out the present invention.

DETAILED DESCRIPTION OF THE PREFERRED EMBODIMENTS

With reference to the figures where like elements have been given like numerical designations to facilitate the reader's understanding of the present invention, the preferred embodiments of the present invention are set forth below. The enclosed figures are illustrative of several potential preferred embodiments and, therefore, are included to represent several different ways of configuring the present invention. Although specific components, materials, configurations and uses are illustrated, it should be understood that a number of variations to the components and to the configuration of those components described herein and shown in the accompanying figures can be made without changing the scope and function of the invention set forth herein. For instance, although the description and figures included herewith generally describe and show particular materials, shapes and configurations for the various components of the new apparatus and system for capturing agricultural liquids below the root zone of a growing area, as well as examples of plants, roots, irrigation systems and sensors with which the new apparatus and system may be utilized, persons who are skilled in the art will readily appreciate that the present invention is not so limited. In addition, the exemplary embodiments of the present invention are shown and described herein with only those components that are required to disclose the present invention. As such, it may be possible that some of the necessary elements for attaching and using the present invention are not shown or necessarily described below, but which are well known to persons who are skilled in the relevant art. As will be readily appreciated by such persons, the various elements of the present invention that are described below may take on any form which is consistent with forms that may be understood by a person of ordinary skill in the art having knowledge of agricultural operations, irrigation systems, soils, root zones and agricultural liquids which may be applied to plants.

Figure 1:
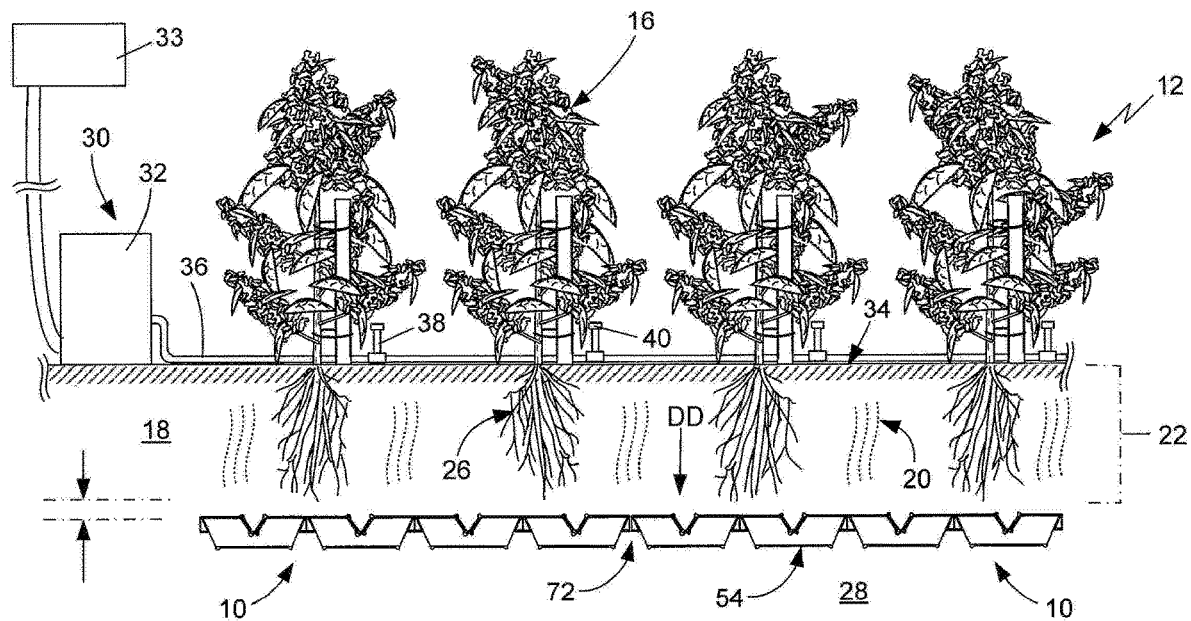
FIG. 1 is a side view of an agricultural liquid conservation system that is configured according to a first embodiment of the present invention showing use of a plurality of in-ground agricultural liquid capture trays which are configured according to a first embodiment of the apparatus of the present invention, with the liquid capture trays positioned below the root zone of the plants to capture agricultural liquids which pass through the root zone.
Figure 2:
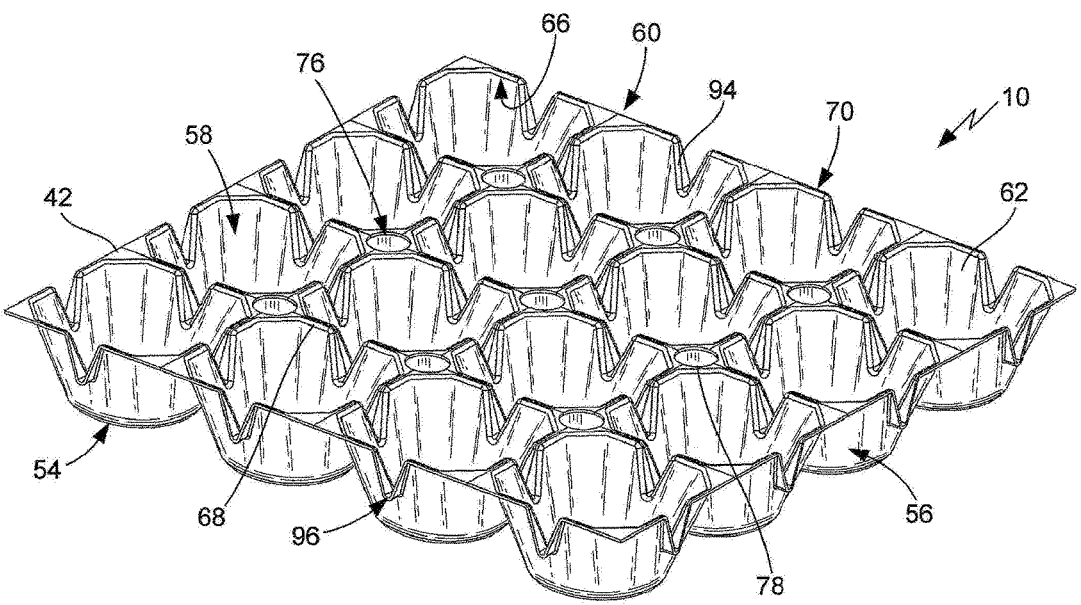
FIG. 2 is a top perspective view of one of the in-ground agricultural liquid capture trays of FIG. 1 better illustrating the reservoirs of the cups thereof.
Figure 3:
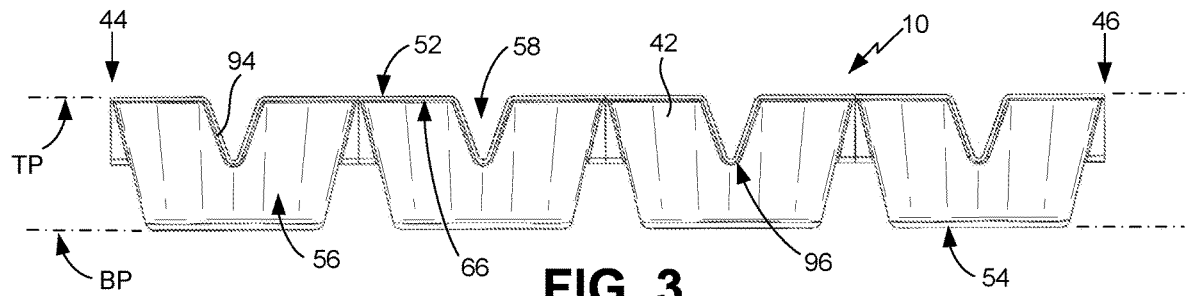
FIG. 3 is a front view of the in-ground agricultural liquid capture tray of FIG. 2.
Figure 4:
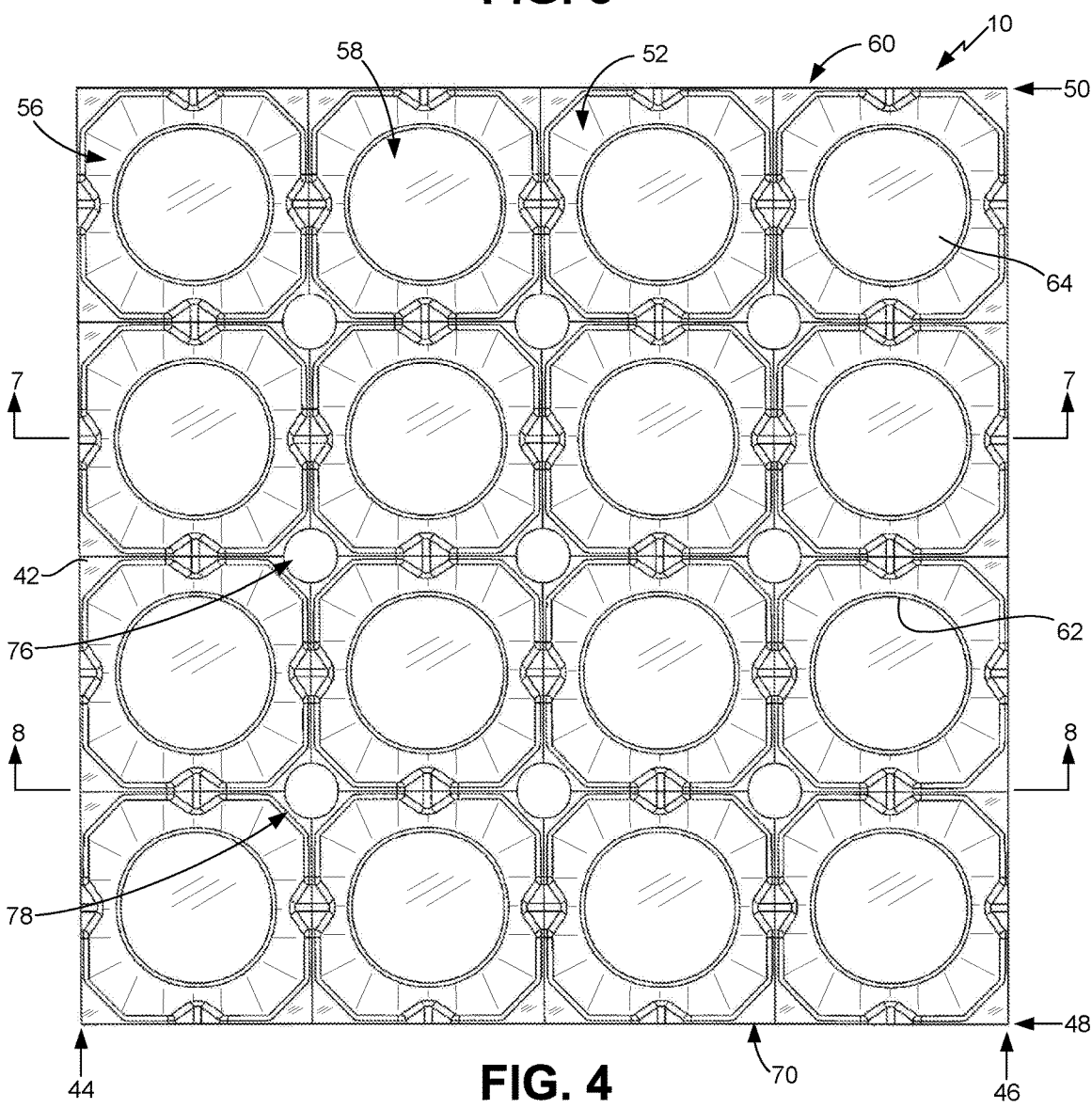
FIG. 4 is a top view of the in-ground agricultural liquid capture tray of FIG. 2.
Figure 5:
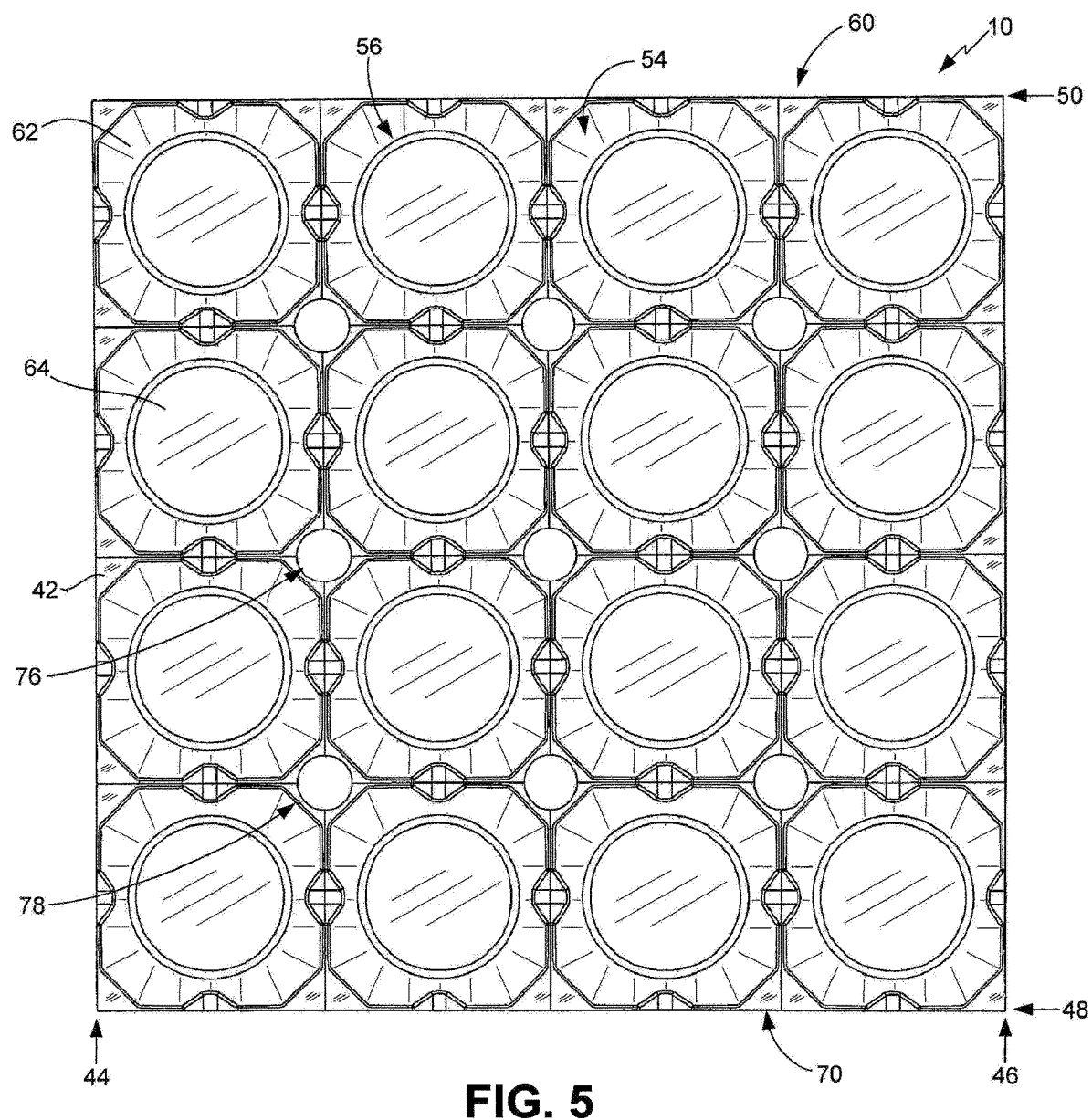
FIG. 5 is a bottom view of the in-ground agricultural liquid capture tray of FIG. 2.
Figure 6:
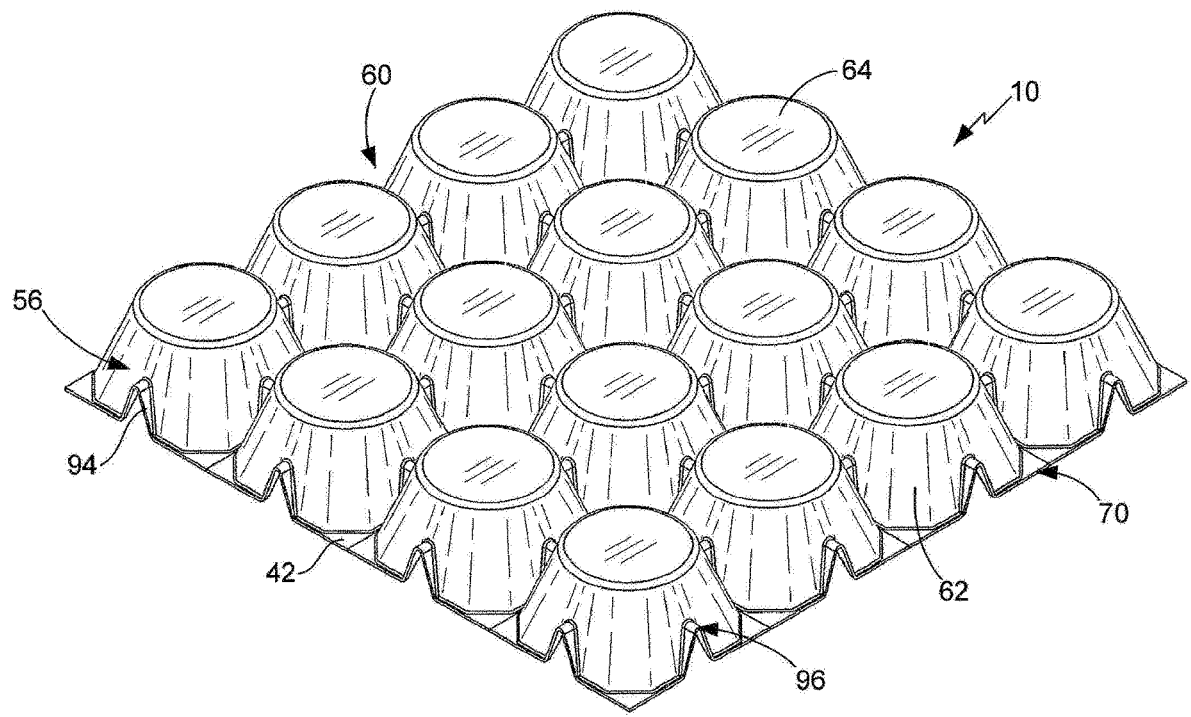
FIG. 6 is a bottom perspective view of the in-ground agricultural liquid capture tray of FIG. 5.
Figure 7:
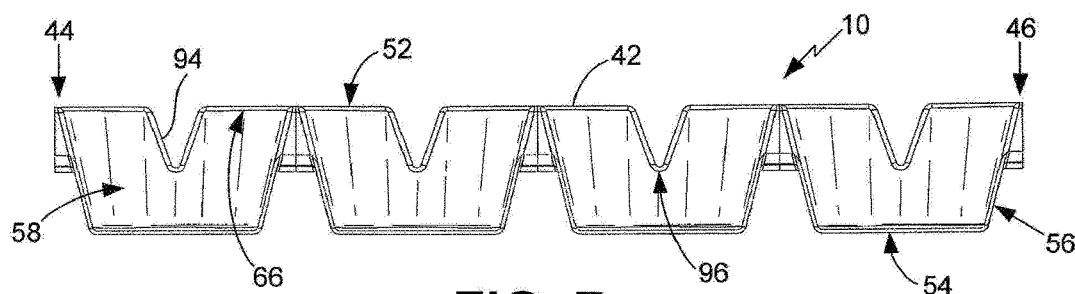
FIG. 7 is a cross-sectional side view of the in-ground agricultural liquid capture tray of FIG. 4 taken through lines 7-7 of FIG. 4.
Figure 8:
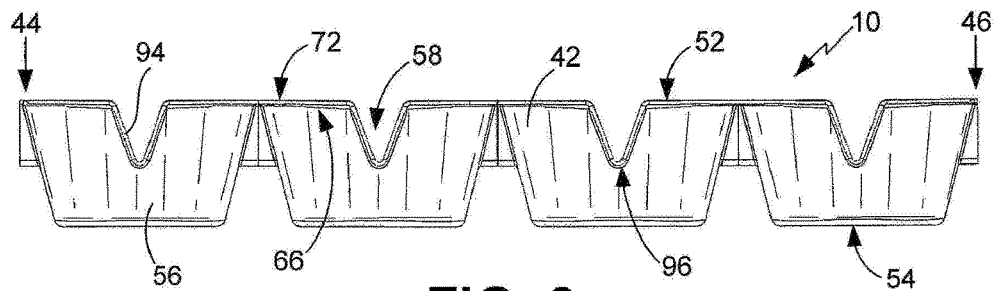
FIG. 8 is a cross-sectional side view of the in-ground agricultural liquid capture tray of FIG. 4 taken through lines 8-8 of FIG. 4.
Figure 9:
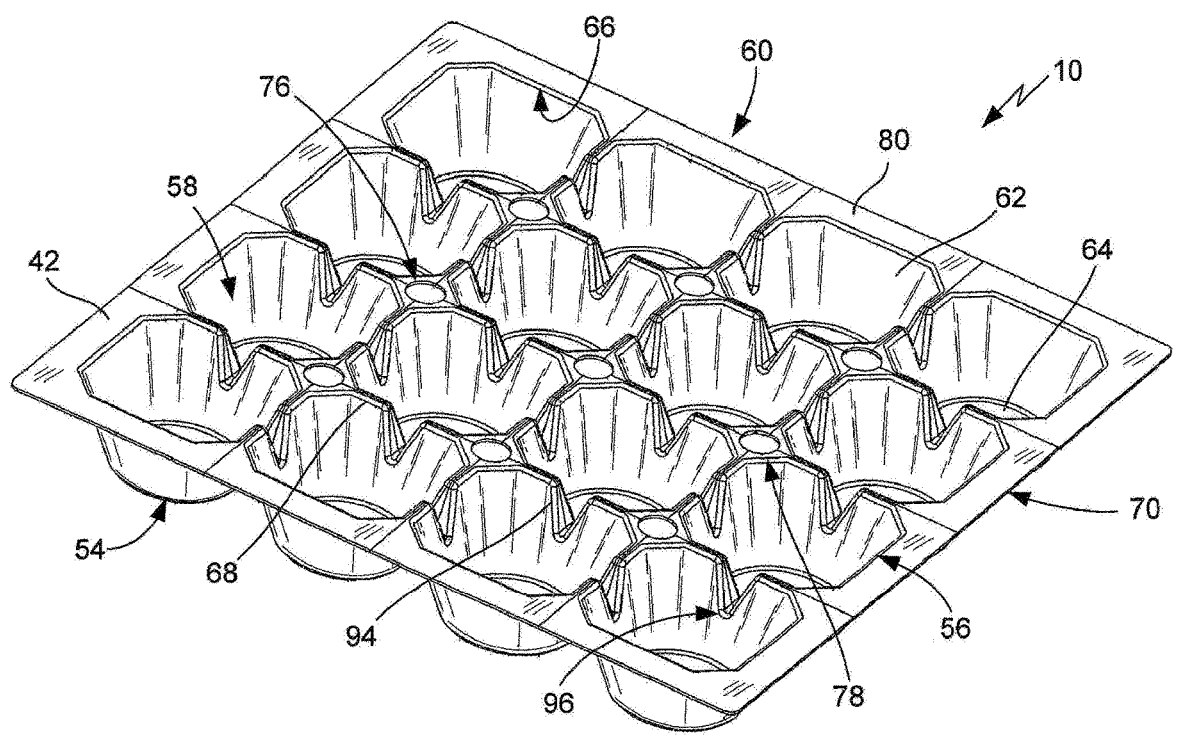
FIG. 9 is a top perspective view of an in-ground agricultural liquid capture tray which is configured according to a second embodiment of the apparatus of the present invention showing the tray body having a peripherally disposed edge wall.
Figure 10:
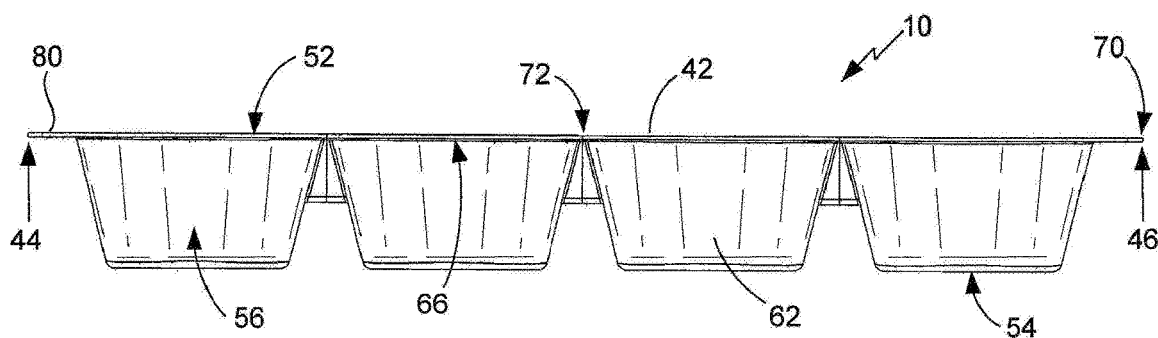
FIG. 10 is a front view of the in-ground agricultural liquid capture tray of FIG. 9.
Figure 11:
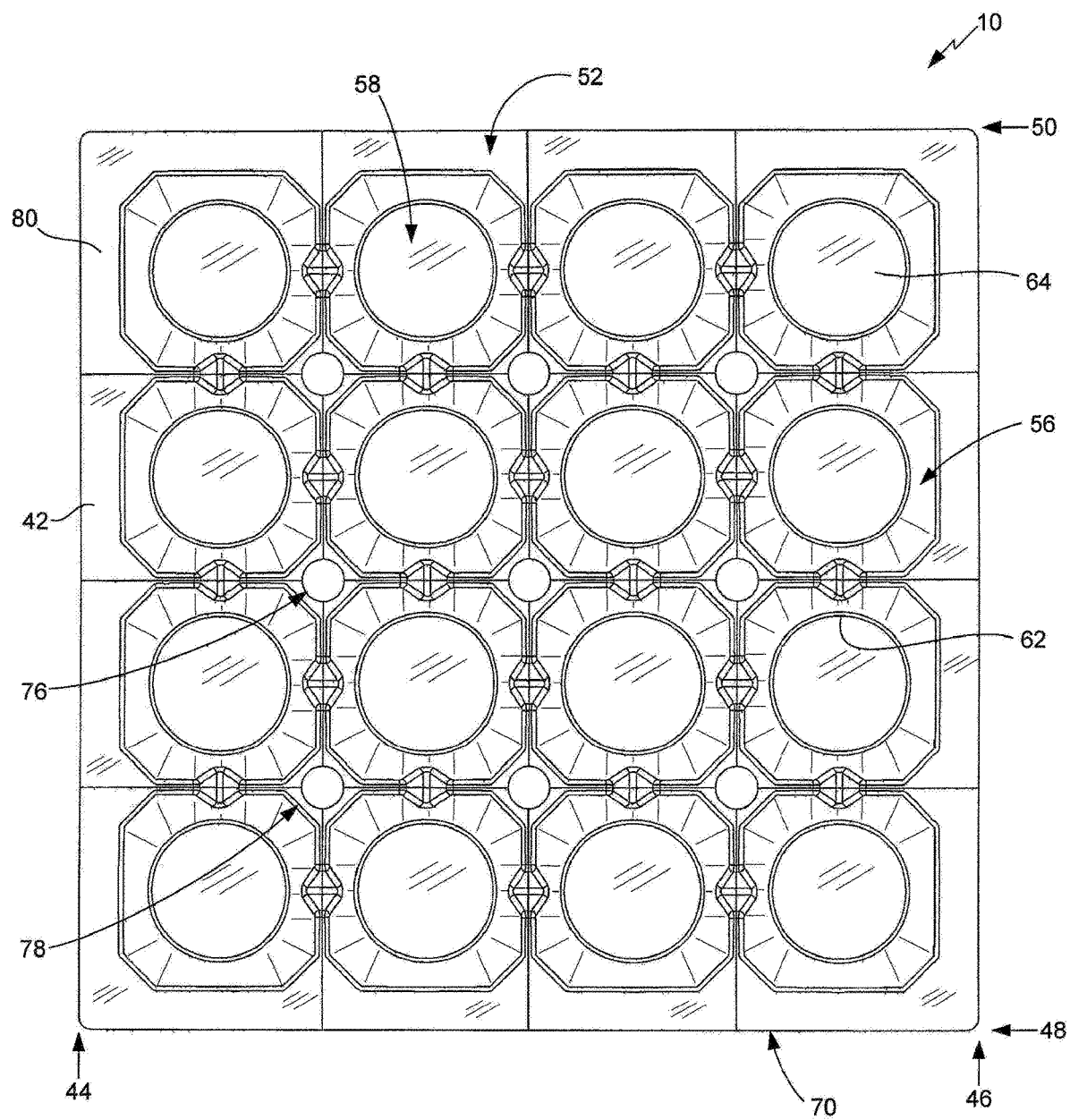
FIG. 11 is a top view of the in-ground agricultural liquid capture tray of FIG. 9.
Figure 12:
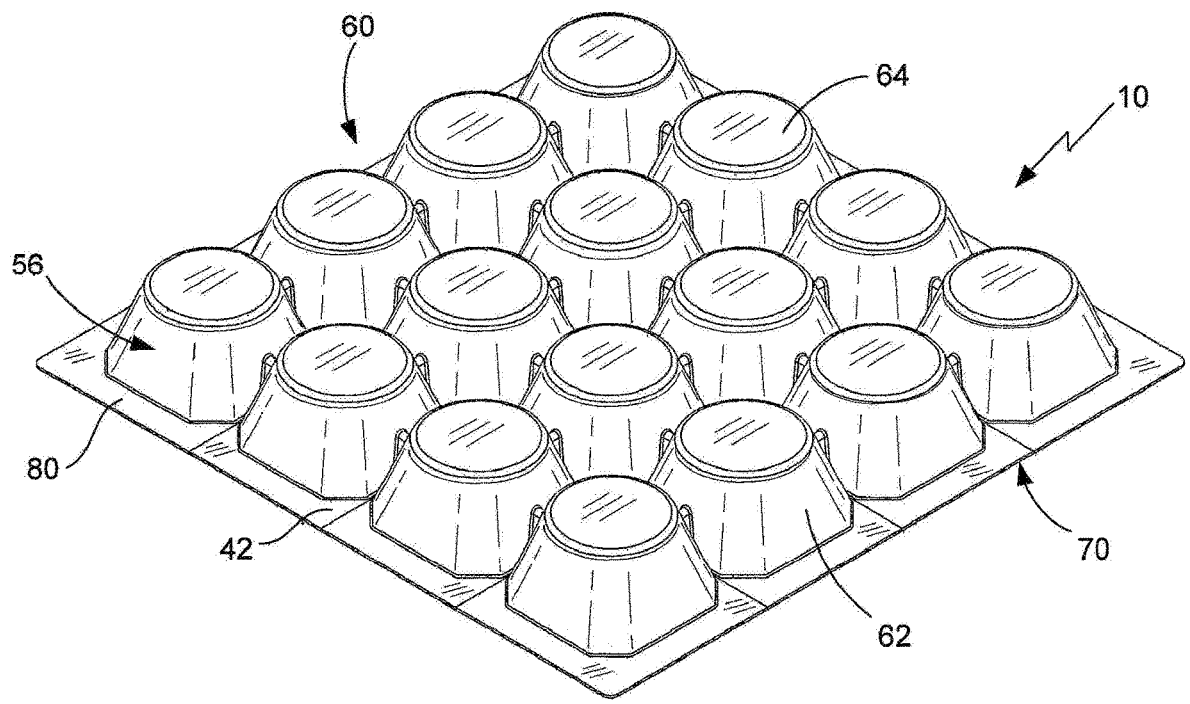
FIG. 12 is a bottom perspective view of the in-ground agricultural liquid capture tray of FIG. 9.
Figure 13:
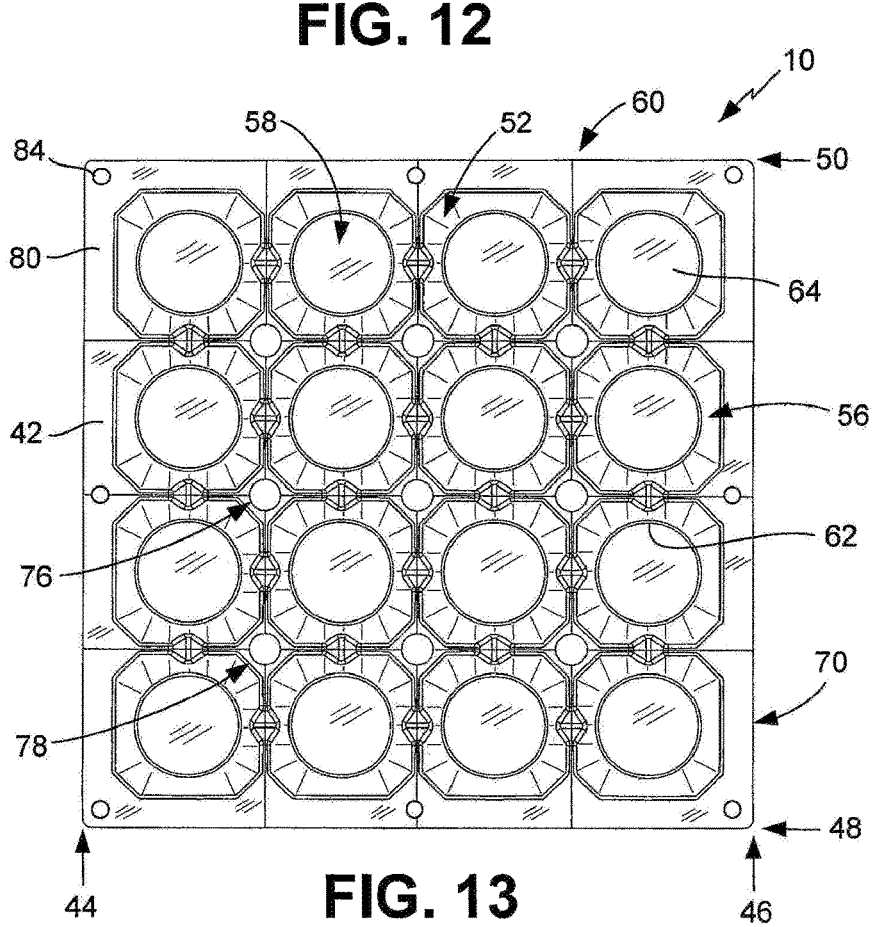
FIG. 13 is a top view of an in-ground agricultural liquid capture tray which is configured according to the embodiment of FIG. 9 showing use of a plurality of connecting apertures in the peripherally disposed side wall of the tray body as a component of a connecting mechanism to join two trays together.
Figure 14:
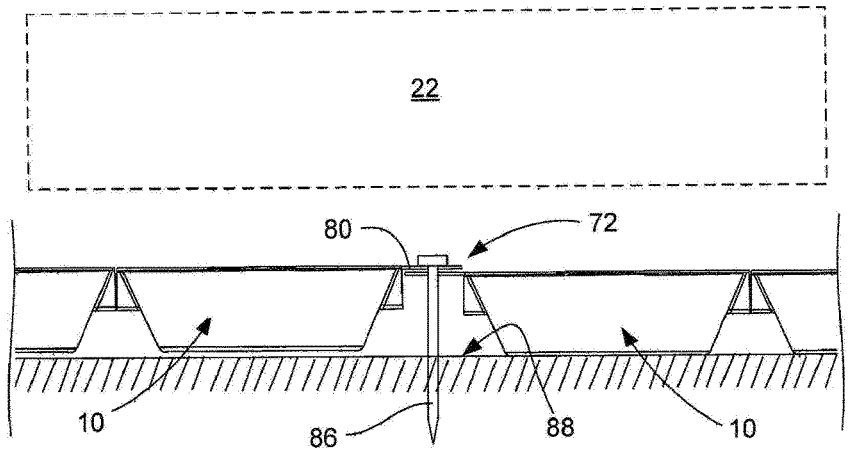
FIG. 14 is a side view of two liquid capture trays configured according to the in-ground agricultural liquid capture tray of FIG. 13, with the edge walls of the two trays shown in overlapping relation and joined along one of their edges using a connector that is positioned through aligned connecting apertures to hold the trays in place on the support soil.

An apparatus that is configured pursuant to one or more preferred embodiments of the present invention is referred to generally as 10 in FIGS. 1-6 and 9-18. A system of utilizing the apparatus 10 is shown as 12 in FIG. 1. As set forth in more detail below, in the preferred embodiments of the present invention, the new apparatus 10 and system 12 are structured and arranged to be utilized in a growing area having one or more plants 16 growing or to be grown in soil 18 to capture agricultural liquids, shown as 20 in FIG. 1 moving in a downward direction (shown as DD in FIG. 1) through the soil 18, that pass through the root zone 22 associated with the plants 16, as best shown in FIGS. 1 and 14. As set forth in the Background, typically a certain amount of the agricultural liquids 20 that are applied to the soil 18 for the benefit, ultimately, of the plants 16 and any crops produced thereby, will not be taken up by the roots 26 in the root zone 22 associated with plants 16 and as such will move to the lower area 28 (which, as shown in FIG. 1, is any soil, rock, caliche or other material below the root zone 22) and, as such, will no longer be able to benefit the plants 16 in the growing area. More specifically, the agricultural liquids 20 that move into and below the lower area 28 are lost to the growing area, which results in wasted agricultural liquids 20. If the soil 18 and lower area 28 are sufficiently permeable, the agricultural liquids 20 could move in a downward direction DD to invade and, depending on the agricultural liquids 20, contaminate a source of water (not shown) below the lower area 28, such as the water table or other water zone, which can result in the agricultural liquids 20 contaminating other areas, including surface areas, drinking water supplies and surface waters. As set forth in more detail below, the new liquid capture tray 10 (as the apparatus) and the liquid conservation system 12 of the present invention are structured and arranged to be positioned between the root zone 22 and the lower area 28 in order to reduce the amount of agricultural liquids 20 that will be wasted and reduce the likelihood that the agricultural liquids 20 will contaminate water zones and/or other areas.

For purposes of describing the various attributes and features of the present invention, the new liquid capture tray 10 and liquid conservation system 12 are shown in use with a growing area having a prior art irrigation system 30 that delivers one or more types of agricultural liquids 20 to the plants 16, as shown in FIG. 1. The irrigation system 30 shown in FIG. 1 comprises a water distribution apparatus 32 such as a manifold or the like that is hydraulically connected to a source of liquid 33, such as a well, tank or the like, to deliver water and other agricultural liquids 20 to the growing area, such as a field or orchard, having a plurality of plants 14 that are planted in the ground 34. An irrigation system 30 may have one or more water distribution lines 36, such as a primary distribution line and a plurality of secondary distribution lines, that are generally spread throughout the planting area 14, often in a grid pattern, to deliver water to upwardly positioned irrigation pipes 38 that may have a water flow control device 40, such as a sprinkler, emitter or the like, which is attached thereto and configured to direct water to the plants 16.

The growing area and irrigation system 30 set forth above and shown in FIG. 1 is only one type of many different types of irrigation systems with which the liquid capture tray 10 and liquid conservation system 12 may be utilized and, as such, is described and shown herein only for exemplary purposes to help describe and show the present invention. For instance, the growing area 14 can be a large or small sized field, garden, container or the like, which may be indoors or outdoors, and the irrigation system 30 may be a drip irrigation system, utilize flood irrigation, have canals and other open conduits, be a circular or rotary sprinkler or even be a hose that is held by a person as he or she waters the plants 16. Likewise, as set forth in the Background, the agricultural liquids 20 may be or comprise water and/or soil amendments such as fertilizers and the like. The plants 16 may be row crops, trees, vines, ornamentals and the like and the crop 24 may be any thing that is beneficially produced by the plants 16. In addition, the soil 18 may be any type of soil in which plants 16 may be beneficially grown. As such, any reference in the text and/or drawings to a particular type, configuration or use of growing area, plant 16, soil 18, agricultural liquid 20 and irrigation system 30 is not limiting in any manner to that particular example. As will be readily appreciated by persons who are skilled in the relevant art, all that is required for beneficial use of the present invention is that there be a growing area having soil 18 in which an agricultural liquid 20 will move in a downward direction DD through the soil 18 in a manner which may cause the agricultural liquid 20 to move below the root zone 22 of one or more plants 16.

The liquid capture tray 10 of the present invention generally comprises a tray body 42 defining a first side 44, second side 46, first end 48, second end 50, upper surface 52 and lower surface 54, as best shown in FIGS. 4, 5, 11 and 13. For purposes of describing the present invention, the distance between the first side 44 and the second side 46 is the width of the liquid capture tray 10 and the distance between the first end 48 and second end 50 is the length of the liquid capture tray 10. In a preferred configuration, each of the upper surface 52 and lower surface 54 are planar, shown in FIG. 3 as having a top plane TP and a bottom plane BP, across the tray body 42 between the first side 44 and second side 46 and between the first end 48 and second end 50, as best shown in FIGS. 3, 7-8, 10 and 14. As described in more detail below, the liquid capture tray 10 is placed under the anticipated root zone 22 of the plants 16 that will be planted in the soil 18 of the growing area with the lower surface 54 of the liquid capture tray 10 placed on a layer of support soil 88, as shown in FIGS. 1 and 14. For purposes of describing the features and benefits of the present invention, the terms "upper", "upward", "upwardly" and the like are utilized in the manner in which those terms are commonly used to refer to or in a direction of a component that is or faces toward the ground surface 34 when the component is positioned below the ground surface 34. Likewise, the terms "lower", "down", "downward", "downwardly" and the like are also utilized in the manner in which those terms are commonly used to refer to or in a direction of a component that is or faces away from the ground surface 34 when the component is positioned below the ground surface 34 (i.e., in the downward direction DD).

Figure 15:
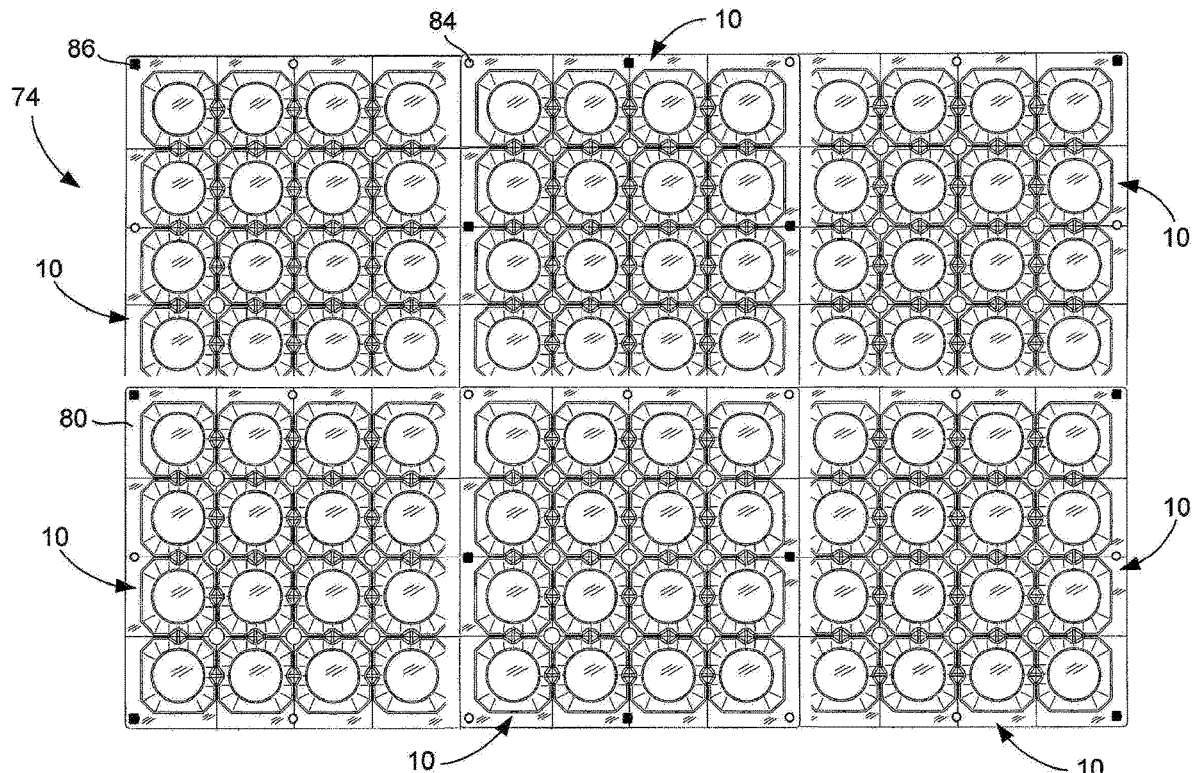
FIG. 15 is a top view of a plurality of liquid capture trays configured according to the in-ground agricultural liquid capture tray of FIG. 13, with the trays shown joined along one of their edges using a connector that is positioned through aligned connecting apertures to form a liquid capture barrier.

The tray body 42 of the liquid capture tray 10 is formed into or out of a plurality of interconnected, adjacent concave cup or cup-like structures (referred to herein as liquid capture cups 56) that are each structured and arranged to define an upwardly disposed reservoir 58, as best shown in FIGS. 2-4, 7-11 and 13-15, which will receive agricultural liquids 20 which pass through the root zone 22 of the plants 16 in the growing area when positioned in the soil 18 below the root zone 22, as shown in FIGS. 1 and 14. The plurality of liquid capture cups 56 are formed into a reservoir matrix 60 that extends at least substantially across the full width and length of tray body 42, as best shown in FIGS. 2, 4, 9, 11, 13 and 15, so that any agricultural liquid 20 which flows in the downward direction DD below the root zone 22 in a growing area will be received in the reservoir 58 of at least one of the liquid capture cups 56, as shown in FIG. 1. In one embodiment, a plurality of liquid capture trays 10 are utilized in side-by-side or adjacent relationship, often by being connected together, below the root zone 22, as shown in FIGS. 1 and 14-15.

Each liquid capture cup 56 has one or more sidewalls 62 and a bottom wall 64 such that each liquid capture cup 56 is open at the upper surface 52 and closed at the lower surface 54 (by bottom wall 64) of the tray body 42, as best shown in FIGS. 2, 6, 9 and 12. The sidewalls 62 and bottom wall 64 of the liquid capture cups 56 are cooperatively structured and arranged to form an upwardly disposed reservoir 58 that is open at the upper end 66 of the sidewalls 62 and closed at the bottom wall 64. The sidewalls 62 and bottom wall 64 are also sized and configured to maintain the structural integrity of the liquid capture tray 10, as well as the reservoir matrix 60, when the liquid capture trays 10 are being moved, stored, placed into position and, perhaps most importantly, when under load due to the weight of the soil 18, plants 16 and any equipment or materials on the ground surface 34. As will be readily appreciated by persons who are skilled in the art, one or more structural supports and/or other design features, including creases or other breaks in the sidewalls 62, can be utilized to provide the structural support to maintain the necessary cup or cup-like shape of the liquid capture cups 56. One such structural support are the ridges 68 formed by adjoining sidewalls 62 of adjacent, interconnecting liquid capture cups 56, as best shown in FIGS. 2, 4-5 and 7-11. In addition to separating the reservoirs 58 between adjacent liquid capture cups 56, the ridges 68 are sized and configured to provide structural support and rigidity for the liquid capture tray 10.

As will also be readily appreciated by persons who are skilled in the relevant art, although the drawings show liquid capture cups being generally round at the upper end 66 of the sidewalls 62 and having a generally round bottom wall 64, the liquid capture cups 56 can have a wide variety of different configurations, including oval, square, rectangle and like shapes. Likewise, such persons will readily appreciate that the individual liquid capture cups 56 can be virtually any size and the reservoir matrix 60 formed by a plurality of liquid capture cups 56 can be virtually any size and any overall shape having any number of reservoir cups 56 across the width or length of the tray body 42, not just the four-by-four configuration shown in the figures. In one example configuration, the reservoir matrix 60 is four feet wide by four feet long with each liquid capture cup 56 being approximately eight to ten inches at the upper end 66 of the sidewalls 62. Each liquid capture tray 10 has one or more edges 70, such as the plurality shown in FIGS. 2, 4-6 and 9-13, that can be placed in adjacent, abutting relation or connected together at a junction area 72 (the location where two liquid capture trays 10 abut or connect), as shown in FIGS. 1 and 14, to form any size liquid capture barrier 74, such as the example shown in FIG. 15, that can be positioned below the root zone 22 of a growing area using a plurality of liquid capture trays 10 placed or connected adjacent each other in abutting or overlapping relation at the junction area 72 of adjacent liquid capture trays 10.

As set forth above and in additional detail below, the liquid capture tray 10 is structured and arranged to capture agricultural liquids 20 that move in the downward direction DD through and below the root zone 22, as shown in FIG. 1, to reduce the amount of agricultural liquids 20 that are lost to the growing area (i.e., wasted) and which may move so far downward to contaminate a water zone below the root zone 22. However, as will be readily appreciated by persons skilled in the art, if the agricultural liquids 20 that pass through the root zone 22 were to back up above the liquid capture tray 10 this could result in the root zone 22 being flooded with the agricultural liquids 20 and inundate the roots 26. As well known to persons in the agricultural industry, such inundation could damage the roots 26 of the plants 16 and potentially result in a reduction in production of the crops and even loss of the plants 16. To avoid such potential damage and loss, the liquid capture tray 10 of the present invention has one or more, preferably a plurality of, overflow apertures 76 in the tray body 42 that will allow agricultural liquids 20 to drain from the liquid capture tray 10 to prevent any build-up of agricultural liquids 20 which could inundate the roots 26 in the root zone 22 above the liquid capture tray 10. In a preferred configuration, the overflow apertures 76 are located at the cup junction 78 between a plurality of liquid capture cups 56, such as at the cup junction 78 between four liquid capture cups 56 shown in FIGS. 2, 4-5, 9,11 and 13. In other configurations, the cup junction 78 may be at the junction of two, three or other number of liquid capture cups 56, which will typically depend on the size and shape of the liquid capture cups 56. Preferably, the overflow apertures 76 are sized and configured so as to provide sufficient drainage to prevent inundation of the root zone 22 but not so large so as to interfere with the ability of the reservoirs 58 to capture and hold agricultural liquids 20 or negatively impact the structural integrity of the liquid capture tray 10.

When the user desires to cover a root zone 22 that is larger than the area provided by a single liquid capture tray 10, he or she can place a plurality of liquid capture trays 10 next to each other in an adjacent, side-by-side relationship, as shown in FIGS. 1 and 14-15. In one embodiment, the user merely positions an edge 70 of one liquid capture tray 10 next to the edge 70 of an adjacent liquid capture tray 10, as shown in FIG. 1, to form the desired size of liquid capture barrier 74, namely a liquid capture barrier 74 that will at least substantially fully extend across the root zone 22. In another embodiment, the liquid capture tray 10 has an edge wall 80 between the rows of liquid capture cups 56 and one or more edges 70 of the tray body 42, as shown in FIGS. 9-16. In the embodiments shown in FIGS. 9-16, the liquid capture tray 10 has an edge wall 80 at each edge 70 of the tray body 42. For this embodiment, adjacent liquid capture trays 10 can be placed next to each other with the adjacent edge walls 80 being disposed in overlapping relation, as shown in FIG. 14. In these configurations, the plurality of liquid capture trays 10 are held in position next to each other, whether in overlapping relation or not, are held in place by the soil 18 above the liquid capture barrier 74. For most uses of the new liquid capture tray 10, the weight of the soil 18 above the liquid capture trays 10 will be sufficient to hold each of the liquid capture trays 10 in the position in which the user placed them. In addition to providing overlapping for abutting liquid capture trays 10 together, the overlapping edge walls 80 will provide additional structural support for the liquid capture trays 10 of the liquid capture barrier 74.

Figure 16:
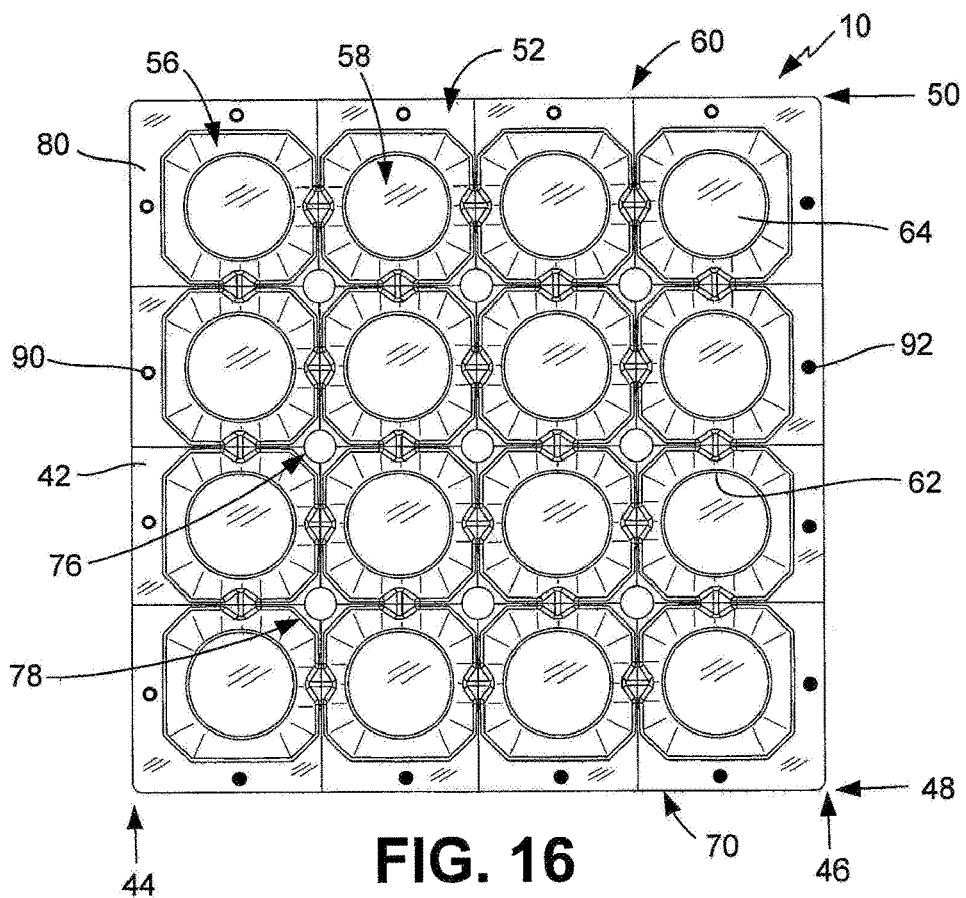
FIG. 16 is a top view of an in-ground agricultural liquid capture tray which is configured according to the embodiment of FIG. 9 showing use of divots and corresponding protrusions on opposing sides of the tray as the connecting mechanism to connect adjacent trays together.

In another configuration, the liquid capture tray 10 of the present invention also has a connecting mechanism that is structured and arranged to more fixedly (but not necessarily permanently) connect two liquid capture trays 10 in an adjacent, side-by-side relationship, such as shown with regard to FIGS. 14-16. In the configuration of FIGS. 14-15, the connecting mechanism that is used to connect two adjacent liquid capture trays 10 together comprises at least one connecting aperture 84 in each liquid capture tray 10 and a correspondingly sized and configured connecting device 86 that is placed through connecting aperture 84 into the support soil 88 on which the lower surface 54 of the tray body 42 is placed when positioning the liquid capture tray 10 below the root zone 22 of a growing area as shown in FIG. 14. In the figures, the liquid capture trays 10 have a plurality of connecting apertures 84 in the edge walls 80 along each side 44/46 and end 48/50 of the tray body 42, as best shown in FIG. 15, and the connecting device 86 is a nail, spike or the like that is sized and configured to fit through a connecting aperture 84 of a liquid capture tray 10 and into the support soil 88, as shown in FIG. 14. In a typical use, shown in FIG. 14, the connecting device 86 will be placed through a pair of overlapping connecting apertures 84 to join two liquid capture trays 10 together in side-by-side relation to form the desired size of liquid capture barrier 74 to span the root zone 22.

In another example configuration of a connecting mechanism, the tray body 42 of each liquid capture tray 10 is structured and arranged to be placed in interlocking relation with another similarly configured liquid capture tray 10. As will be readily appreciated by persons who are skilled in the art, a wide variety of interlocking configurations can be utilized for the connecting mechanism. Most such interlocking configurations will require modification of one or more of the sides 44/46 and ends 48/50 of the tray body 42. In one configuration, the interlocking configuration comprises one or more, typically a plurality, of specially configured recesses 90 on one side 44/46 and/or one end 48/50 of the tray body 42 and one or more, also typically a plurality, of cooperatively configured protuberances 92 on the other side 44/46 and/or end 48/50 of the tray body 42. In the embodiment of FIG. 16, the liquid capture tray 10 has recesses 90 on one of each of the sides 44/46 and ends 48/50 of the tray body 42 and corresponding protuberances 92 on one of each of the sides 44/46 and ends 48/50 of the tray body 42, which allows any two like configured liquid capture trays 10 to be interlockingly engaged in any direction desired by the user to define the liquid capture barrier 74. The recesses 90 for the interlocking connecting mechanism can be divots, grooves, cavities or the like. As set forth above, each protuberance 92 is sized and configured to be received in a recess 90. In a preferred configuration, the recesses 90 and the protuberances 92 are cooperatively structured and arranged for the protuberance 92 to be lockingly engaged with a recess 90 to connect two adjacent liquid capture trays 10 in side-by-side relation.

Figure 18:
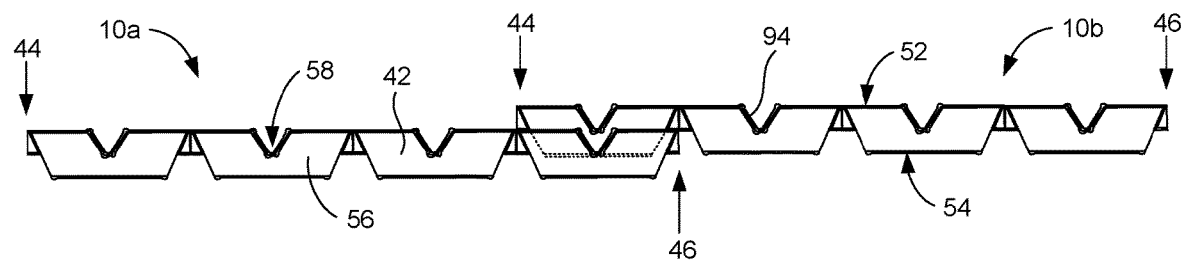
FIG. 18 is a side view of two adjacent in-ground agricultural liquid capture trays that are each configured according to the embodiment of FIG. 2 showing the two trays in overlapping arrangement with the row of liquid capture cups at a first end of the second tray in the row of liquid capture cups at a second end of the first tray.

In another configuration, at least some of the liquid capture cups 56 of the liquid capture tray 10 of the present invention are sized and configured to be received in the liquid capture cups 56 of an adjacent liquid capture tray 10, as shown in FIG. 18. The two adjacent liquid capture trays 10 of FIG. 18, shown as first tray 10*a* and second tray 10*b*, each have a tray body 42 that comprises liquid capture cups 56 at the sides 44/46 and/or ends 48/50 that are each cooperatively sized and configured to fit within each other to join the first tray 10*a* and second tray 10*b* together. More specifically, the row of liquid capture cups 56 at the sides 44/46 and/or ends 48/50 of the second tray 10*b* are sized and configured to be received in the row of liquid capture cups 56 at the adjacent side 44/46 and/or end 48/50 of the first tray 10*a*. In the embodiment of FIG. 18, the liquid capture cups 56 at the first end 48 of the second tray 10*b* are received inside the liquid capture cups 56 at the second end 50 of the first tray 10*a* to place the two trays 10*a*/10*b* in overlapping arrangement with each other.

In a preferred configuration, the liquid capture tray 10 of the present invention also has a plurality of wall cut-outs 94 in one or more sidewalls 62 of one or more of the liquid capture cups 56, as best shown in FIGS. 2-3 and 6-9. In the figures, every sidewall 62 of each of the liquid capture cups 56 has a wall cut-out 94 and the wall cut-outs 94 are positioned such that all the wall cut-outs 94 are aligned across the width and length of the liquid capture tray 10, as best shown in FIGS. 2, 4, 9, 11 and 13. FIG. 15 shows the combined liquid capture tray 10 being configured such that the wall cut-outs 94 are in alignment across the width and length of the liquid capture barrier 74. In a preferred embodiment, each of the wall cut-outs 94 have a generally U-shaped or V-shaped configured defining a lower end 96, as best shown in FIGS. 2-3 and 6-8. The primary benefit of the wall cut-outs 94 is that they allow agricultural liquids 20 to flow from the reservoir 58 in one liquid capture cup 56 to an adjacent liquid capture cup 56 as the reservoir 58 of the first liquid capture cup 56 fills with agricultural liquids 20 to disperse the agricultural liquid 20 across the width and length of the liquid capture tray 10. As will be readily appreciated by persons who are skilled in the art, this will provide multiple benefits when using the new liquid capture tray 10 below the root zone of a growing area and for the liquid conservation system 12.

One of the benefits of the new liquid capture tray 10 and the liquid conservation system 12 is that instead of wasting agricultural liquids 20 that pass through the root zone 22 (and creating pollution risks), the liquid capture tray 10 keeps the agricultural liquids 20 in position below the root zone 22 of the growing area where the agricultural liquids 20 will remain available to benefit the plants 16 by being drawn up (i.e., absorb through soil by transpiration) by the roots 26 of plants 16. As a result, one of the benefits of using the wall cut-outs 94 to spread the agricultural liquids 20 at least generally across the upper surface 52 of the new liquid capture tray 10 is that the agricultural liquids 20 that collect in the reservoirs 58 will be available to more plants 16 in the growing area, not just those plants 16 that are directly above where the agricultural liquids 20 originally percolated through the root zone 22. Another benefit of spreading the agricultural liquids 20 across the upper surface 54 of the liquid capture tray 10 (i.e., namely, from one reservoir 58 to an adjacent reservoir 58) is that instead of draining over one of the sides 44/46 or ends 48/50 of the tray body 42 or through the overflow apertures 76, all of which are vertically above (i.e., upwardly positioned relative to) the lower end 96 of the wall cut-outs 94, the agricultural liquids 20 will stay in the reservoir matrix 60 formed by the liquid capture tray 10. Keeping the agricultural liquids 20 in the reservoir matrix 60 further reduces waste of the agricultural liquids 20 and reduces the likelihood of agricultural liquids 20 contaminating groundwater or other water zones below the root zone 22 of the growing area. Allowing agricultural liquids 20 to move across the upper surface 52 of the liquid capture tray 10 also reduces the likelihood the agricultural liquids 20 will build up in one section of the liquid capture tray 10 and inundate the roots 26 above that location.

Another benefit of the wall cut-outs 94 is that they allow the user to place below-ground irrigation tubes, pipes, lines and the like flow lines 98 (such as the drip irrigation lines shown in FIG. 17), which can be provided with emitters or other types of subsurface flow control devices 100, across the upper surface 52 of the tray body 42 of liquid capture tray 10. In the embodiment shown in FIG. 17, a pair of flow lines 98, which are joined by a connector, cross the upper surface 52 of the liquid capture tray 10 by being positioned in a set of aligned wall cut-outs 94. As will be readily appreciated by persons who are skilled in the art, use of the wall cut-outs 94 allow the user to more accurately position the flow lines 98 and the associated subsurface flow control devices 100 on the liquid capture tray 10 and will help hold the flow lines 98 and subsurface flow control devices 100 in place when the soil 18 is placed on top of the liquid capture tray 10. In addition to being useful for receiving and holding flow lines 98 and flow control devices 100, the wall cut-outs can be utilized to position subsurface sensors 102, such as soil sensors, water sensors and the like, on the liquid capture tray 10 in a manner which holds the sensors 102 in the desired position. As will be readily appreciated by persons who are skilled in the art, sensors 102 can be utilized to monitor the conditions at or near the lower end of the root zone 22 of the growing area to determine, among other conditions, if the agricultural liquids 20 are able to percolate through the root zone 22 and/or if too much is percolating through the root zone 22. The sensors 102, the data from which is available to persons who operate the growing area, can help the user to optimize the amount of agricultural liquids 20 that are utilized to grow the plants 16 and crops therefrom. As persons skilled in the art will readily appreciate, a wide variety of flow lines 98, flow control devices 100 and sensors 102 can be beneficially utilized with the liquid capture tray 10 of the present invention.

The tray body 42 of the new liquid capture tray 10 can be made out of a wide variety of different types of material, including plastic, rubber, metal, wood, ceramic and composites, that can be formed into the tray body 42 having the features described herein. The materials for tray body 42 should also be selected to support the anticipated loading of the soil 18, plants 16 and any equipment (i.e., components of the irrigation system 30) that are placed on the ground surface 34. The material for the tray body 42 should be selected to be suitable in soil and wet conditions, particularly those caused by the chemicals in the agricultural liquids 20, so it can have a long life in the soil 18. In one of the preferred embodiments, the material for the tray body 42 is selected so the liquid capture tray 10 will be flexible enough to be rolled up in a roll, which will make the liquid capture tray 10 more convenient to store and transport, particularly for long and/or wide lengths of the liquid capture tray 10. For non-rolled storage and transport, the liquid capture cups 56 formed from the tray body 42 should be sized and configured so that one liquid capture tray 10 can be stacked on top of another liquid capture tray 10 and the tray body 42 should be selected to be strong enough that multiple liquid capture trays 10 can be stacked on top of each other. Although the liquid capture cups 56, or groups thereof, can be separately formed and connected together to form the liquid capture tray 10, in the preferred embodiments, the liquid capture tray 10 is made as a single integral unit with the liquid capture cups 56 molded, cut or otherwise formed from a single piece tray body 42. In one embodiment, the liquid capture tray 10 is made from polyethylene or the like. In other embodiments, the liquid capture tray 10 is made from recycled materials, including rubber tires, plastic bottles and milk containers.

The agricultural liquid conservation system 12 of the present invention generally comprises a growing area having one or more plants 16 that are growing in soil 18 with roots 26 that extend downward into a root zone 22, one or more agricultural liquids 20 that are directed to the growing area to flow into the soil 18 and in a downward direction DD to the root zone 22, and one or more liquid capture trays 10 that are positioned, typically in soil 18, below the root zone 22 of the plants 16, as shown in FIG. 1, with each of the one or more liquid capture trays 10 having a tray body 42 with a plurality of interconnected liquid capture cups 56 that each define an upwardly disposed reservoir 58 that will receive any agricultural liquids 20 that flow through the root zone 22 to reduce waste of the agricultural liquids 20 and the likelihood of contaminating any underground water below the root zone 22. As set forth above, the growing area can be a large field, small field, garden, rows of containers or even a single container (i.e., for indoor growing). The plants 16 can be any type of plant that can be beneficially grown in soil 18 for any purpose, including to grow crops or for ornamental, shade, boundary and like purposes. The soil 18 can be natural soil or it can be a specially prepared and formulated mix of materials that is selected for the plants 18. The agricultural liquids 20 can be water, fertilizers or other soil enhancements, chemicals applied to the plants 18 which may drain into and percolate through the soil 18 or any combination thereof, including soil enhancements which are added to irrigation water. The agricultural liquids 20 are supplied by an irrigation system 30 appropriate for the growing area. In some circumstances, the irrigation system 30 will comprise a water distribution apparatus 32 and water distribution lines, which may connect to irrigation pipes 38 having a flow control device 40 associated therewith, that delivers agricultural liquids 20 to the plants 16, as shown with regard to the example set forth in FIG. 1. In other embodiments, the irrigation system 30 may be or comprise a rotating sprinkler mechanism, pop-up sprinklers, drip irrigation, open trenches or pipes, manual use watering cans or buckets, hand-held hoses with sprinklers or any other manner of delivering the agricultural liquids 20 to the plants 16. The source of agricultural liquids 33, whether the agricultural liquids 20 comprise water, soil amendments or a combination thereof, can be a well, tank, faucet connected to municipal water supply or the like. The liquid capture trays 10 for the new system 12, which can be utilized by themselves or in groups to form a liquid capture barrier 74, can comprise the various components and features set forth above with regard to the liquid capture trays 10.

Figure 17:
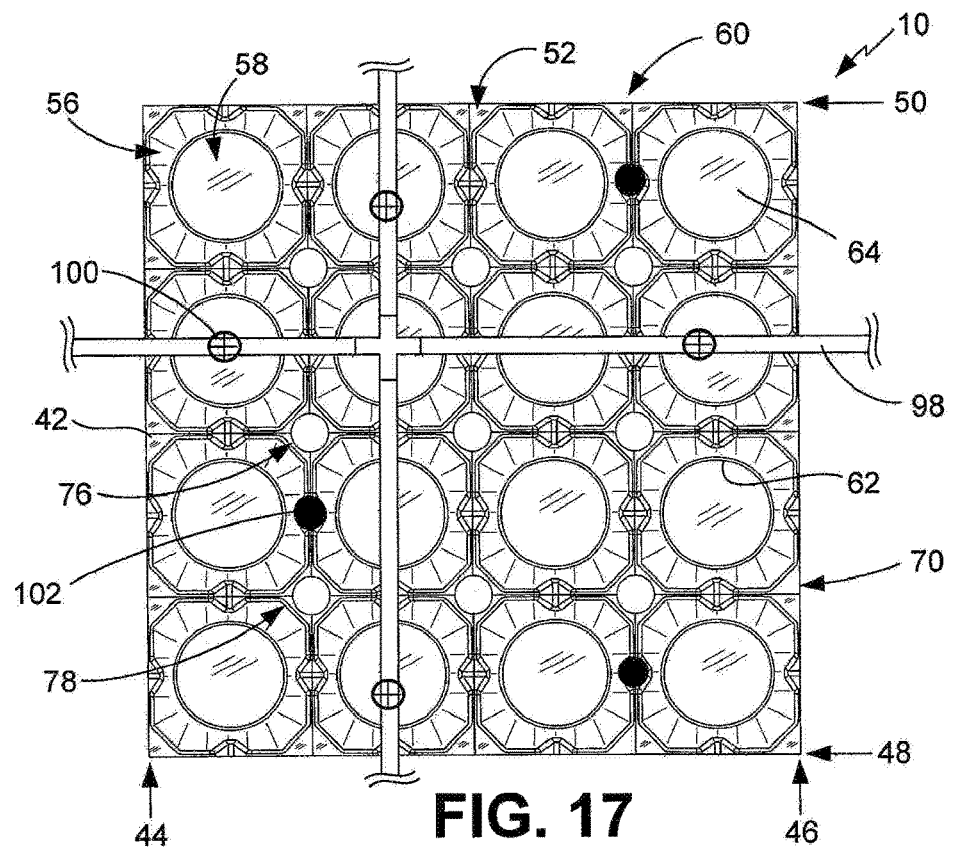
FIG. 17 is a top view of an in-ground agricultural liquid capture tray which is configured according to the embodiment of FIG. 9 showing flow lines and sensors positioned in the wall cut-outs.

In use, the user will prepare the growing area by clearing the soil 18 down below the anticipated root zone 22 of plants 16 which will be beneficially grown with the new system 12 to a surface that will serve as the support soil 88 on which one or more liquid capture trays 10 will be placed, as shown in the example of FIG. 14. For agricultural fields, as the growing area, the liquid capture trays 10 should (unless made out of a material which can be cut-up and used in the soil 18) be placed below the seasonal tilling depth for the field. Although the liquid capture trays 10 can be placed any distance below the anticipated root zone 22, it is likely to be preferred that the liquid capture trays 10 be placed a few inches (or less) to a foot below the anticipated root zone 22 of the plants 16 to better facilitate uptake of the agricultural liquids 20 from the various reservoirs 58 of the liquid capture trays 10 by transpiration. If desired, the user will place one or more flow lines 98, with or without flow control devices 100, across the upper surface 52 of the one or more liquid capture trays 10 by placing the flow lines 98 in the wall cut-outs 96, as shown in FIG. 17. One or more sensors 102 can also be placed in one or more wall cut-outs 96 or elsewhere on the liquid capture tray 10. If desired, the user may place a filter or weed blocking device, such as one of the specially configured soil/weed cloths which are commercially available (i.e., a polypropylene drainage and filtration fabric, such as commonly utilized for soil reinforcement, filtration, weed control and erosion control), across the upper surface 52 of each liquid capture tray 10 to reduce the amount of soil 18 that falls into the reservoirs 58 of the liquid capture tray 10 and the intrusion of roots 26, as the plants 16 grow, into of those reservoirs 58. The use of a blocking device is likely to allow the user to place the liquid capture tray 10 closer to the lower end of the anticipated root zone 22 of the plants 16. Soil 18 is then placed on top of the liquid capture tray 10, with a portion of the soil 18 defining the root zone 22 of the plants 16 that will be grown in the soil 18. The soil 18 filled in above the liquid capture tray 10 will form a ground surface 34 in which the plants 16 will be planted or otherwise grown. As may be necessary or desired, depending on the growing area, the user will install or hook-up an existing irrigation system 30 to deliver agricultural liquids 20 to plants 16 in the growing area.

After the agricultural liquids 20 are applied to the plants 16, directly or (typically) via the soil 18, the agricultural liquids 20 will move in a downward direction DD through the soil 18 to the roots 26 of the plants 16. As well known to persons who are skilled in the art, a portion of the agricultural liquids 20 will move downward through the root zone 22 to exit at the lower end thereof. With the one or more liquid capture trays 20 (i.e., a liquid capture barrier 74) in place, the agricultural liquids 20 which pass through the root zone 22 will be captured in the reservoirs 58 of the reservoir matrix 60 of a liquid capture tray 10, thereby reducing the amount of agricultural liquids 20 that will be wasted (i.e., lost to the growing area) and which could possibly contaminate groundwater or other water sources below the root zone 22. Instead of being wasted or contaminating water, the agricultural liquids 20 which pass through the root zone 22 and are collected in the reservoirs 58 formed by the matrix of liquid capture cups 56 will be available for use by the plants 16 through the upward absorption of the agricultural liquids 20 from the liquid capture tray 10 to the roots 26 via transpiration of the agricultural liquids 20 through the soil 18 below the root zone 22 and into the root zone 22. As will be readily appreciated by persons who are skilled in the relevant art, the new liquid conservation system 12 having liquid capture tray 10 will reduce the amount of agricultural liquids 20 which will be needed to grow the plants 16 and provide for much more efficient use of the agricultural liquids 20, which should reduce costs for the agricultural liquids 20 and may provide for healthier plants 16 and, where applicable, increased production of crops.

In addition to the foregoing, the configuration of the liquid capture tray 10 will allow utilization of some of the agricultural liquids 20 which pass below the liquid capture tray 10 by passing through the overflow apertures 76 or over the sides 44/46 and/or ends 48/50 of the tray body 42. As will be readily appreciated by persons who are skilled in the art, evaporation of agricultural liquids 20 beneath the liquid capture tray 10 is blocked, restricted and/or limited. Once the agricultural liquid 20 within and above the liquid capture tray 10 is significantly reduced, the agricultural liquid 20 beneath the liquid capture tray migrates upward through the overflow apertures to equalize the vapor pressure in the soil 18. This results in the plants 16 being able to transpire additional agricultural liquid 20 that was previously stored or captured beneath the agricultural liquid tray 10.

Figure 19:
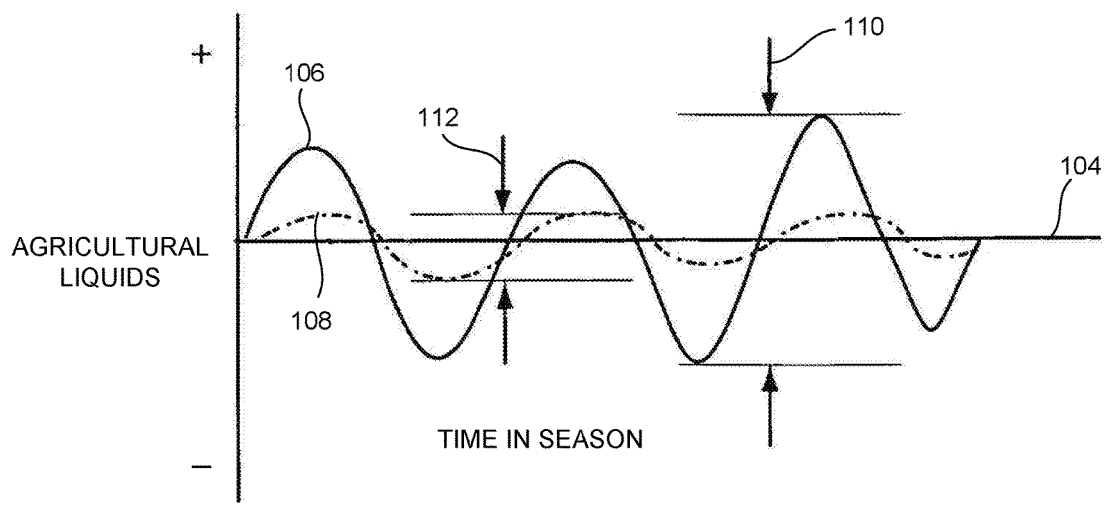
FIG. 19 is a graph comparing the wet-dry cycles and stresses that traditional farming systems and the agricultural liquid conservation system of the present invention place on plants showing the reduced amplitudes provided by use of the system of the present invention.

The new liquid capture tray 10 and system 12 of the present invention will help the user to better balance the delivery of the agricultural liquids 20 throughout the growing season to achieve a delivery which, as shown in FIG. 19, is much closer to what would be an optimal level, shown as 104 (i.e., the x-axis). The optimal level 104 in FIG. 19 is the amount of agricultural liquids 20 that would to be an optimal level of such liquids 20 resident in the soil 18. The amount of agricultural liquids 20 (i.e., water, fertilizer, pesticide, herbicide and the like) is the y-axis. The graph of FIG. 19 compares the wet-dry cycles and stresses placed on plants 16 that results from traditional farming systems (graph line shown as 106) and the wet-dry cycles and stresses placed on plants 16 which result from the agricultural liquid conservation system 12 of the present invention (graph line shown as 108). The agricultural liquid levels 106 of traditional farming systems results in a peak-to-peak conventional stress amplitude 110 and the peak-to-peak agricultural liquid levels 108 of the present system 12 results in a stress amplitude 112. As will be readily appreciated by persons who are skilled in the art, and as is shown in the graph of FIG. 19, the stress amplitude 112 of the present system 12 is significantly lower then the conventional stress amplitude 110 of traditional farming systems and methods. The graph line of the agricultural liquid levels 108 shows that the amount of over-application of agricultural liquids 20 has been reduced due to controlling the over-drainage of agricultural liquids 20 by use of the liquid capture tray 10 of the present invention. Observation of commercial crops over a growing season has shown that plants 16 which were stressed less (curve 108) were substantially larger and better developed than control plants 16 that were subject to the graph line of the agricultural liquid levels 106 of the conventional system. As will be readily appreciated by persons skilled in the art, a consistent maintenance of agricultural liquids 20 from the liquid capture and liquid dispersion system of the liquid capture tray 10 and system 12 of the present invention affect product of crops by the plants 16, namely better crop production within a shortened growth cycle.

While there are shown and described herein specific forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to any dimensional relationships set forth herein and modifications in assembly, materials, size, shape and use. For instance, there may be numerous components of the embodiments described herein that can be readily replaced with equivalent functioning components to accomplish the objectives and obtain the desired aspects of the present invention. The various embodiments set forth herein are intended to explain the best mode of making and using the present invention as currently known to and appreciated by the present inventor(s) and to enable other persons who are skilled in the relevant art to make and utilize the present invention. Although the described embodiments may comprise different features, not all of these features are required in all embodiments of the present invention. More specifically, as will be readily appreciated by persons who are skilled in the art, certain embodiments of the present invention only utilize some of the features and/or combinations of features disclosed herein.

What is claimed is:

1. An agricultural liquid conservation system, comprising:
a growing area having soil below a ground surface;
one or more plants growing in said soil of said growing area, each of said one or more plants having roots associated therewith;
a root zone in said soil below said one or more plants in which said roots extend therethrough;
an irrigator configured to apply an agricultural liquid to said growing area to benefit said one or more plants by flowing through said soil and into said root zone; and
one or more liquid capture trays positioned in said soil below said root zone and delineating a lower area of the soil so as to receive said agricultural liquids which pass downward through said root zone, each of said one or more liquid capture trays comprising:
a rectilinear tray body having an upper planar surface, a lower planar surface, and four edges, the tray body comprising a grid of adjacent interconnected concave-shaped liquid capture cups disposed substantially across said tray body between the edges;
said upper planar surface of said tray body positioned upward and distanced from said root zone such that the roots from the root zone do not pass through the upper planar surface into the tray body, said upper and said lower planar surfaces being parallel and forming the upper and lower bounds of the tray body, respectively;
each of said liquid capture cups having one or more sidewalls and a bottom wall, each of said liquid capture cups being open at an upper end of said one or more sidewalls to define an upwardly disposed reservoir in each of said liquid capture cups such that when said agricultural liquids drain through said root zone at least a portion of said agricultural liquids will be captured in said reservoirs of said liquid capture cups;
each liquid capture cup is interconnected with an adjacent neighbor liquid capture cup via a wall cut-out in each respective sidewall, said wall cut-out being structured and arranged to place said reservoirs of said one or more adjacent liquid capture cups in fluid flow communication so as to allow the agricultural liquids that are received in said reservoir of one of said one or more adjacent liquid capture cups to flow into said reservoir of another of said one or more adjacent liquid capture cups so as to generally disperse the agricultural liquids across the tray body; and
one or more overflow apertures disposed through said upper planar surface of said tray body, each of said one or more overflow apertures being positioned on said tray body to drain the agricultural liquids from said liquid capture tray when said reservoirs of said liquid capture cups fill with the agricultural liquids to prevent inundating the root zone of the growing area and the roots of the plants with the agricultural liquids.

2. The agricultural liquid conservation system of claim 1, wherein the tray body is distanced below the root zone by a distance of 2.5 cm-30.5 cm to assist the plants in transpiration.

3. The agricultural liquid conservation system of claim 1, further comprising a filter placed on the upper planar surface of the tray to block soil and roots from breaching into the liquid capture cups.

\* \* \* \* \*